US009501628B2

(12) United States Patent
Aratsu et al.

(10) Patent No.: US 9,501,628 B2
(45) Date of Patent: Nov. 22, 2016

(54) GENERATING A DISTRUBITION PACKAGE HAVING AN ACCESS CONTROL EXECUTION PROGRAM FOR IMPLEMENTING AN ACCESS CONTROL MECHANISM AND LOADING UNIT FOR A CLIENT

(75) Inventors: Taku Aratsu, Tokyo (JP); Sanehiro Furuichi, Tokyo (JP); Masami Tada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 13/821,562

(22) PCT Filed: Jul. 1, 2011

(86) PCT No.: PCT/JP2011/065184
§ 371 (c)(1),
(2), (4) Date: May 1, 2013

(87) PCT Pub. No.: WO2012/039178
PCT Pub. Date: Mar. 29, 2012

(65) Prior Publication Data
US 2013/0219462 A1    Aug. 22, 2013

(30) Foreign Application Priority Data
Sep. 22, 2010 (JP) .................................. 2010-211870

(51) Int. Cl.
*G06F 21/10* (2013.01)
*G06F 21/55* (2013.01)
(Continued)

(52) U.S. Cl.
CPC ............. *G06F 21/10* (2013.01); *G06F 21/556* (2013.01); *G06F 21/62* (2013.01); *H04L 63/102* (2013.01); *H04L 67/1097* (2013.01); *G06F 2221/2119* (2013.01); *H04L 63/0428* (2013.01)

(58) Field of Classification Search
CPC ...... G06F 21/10; G06F 21/556; G06F 21/62; G06F 2221/2119; H04L 63/0428; H04L 67/1097; H04L 63/102

USPC ........................................................ 726/1
See application file for complete search history.

(56) References Cited

U.S. PATENT DOCUMENTS 7,657,946 B2    2/2010  Yan
8,027,936 B2    9/2011  Ito
(Continued)

FOREIGN PATENT DOCUMENTS

CN    101835148 A    9/2010
JP    9-134302       5/1997
(Continued)

OTHER PUBLICATIONS

International Search Report, dated Apr. 25, 2013, for International Application No. PCT/JP2011/065184, filed Jul. 1, 2011, pp. 1-7.
(Continued)

*Primary Examiner* — Farid Homayounmehr
*Assistant Examiner* — Sanchit Sarker
(74) *Attorney, Agent, or Firm* — David W. Victor; Konrad, Raynes, Davda and Victor LLP

(57) ABSTRACT

A data distribution system, method and program for generating a distribution package for distribution data to a client. An environment of a requesting client requesting distribution data is detected. A determination is made of an access control execution program for implementing an access control mechanism and a loading unit on the requesting client. The access control execution program is adapted to the detected environment of the requesting client and control access to a resource from a process in the client. The loading unit loads the distribution data to a protected storage area of the client. A determination is made of a security policy specified for the distribution data. A distribution package is generated including the distribution data, the security policy, the loading unit, and the access control execution program adapted to the environment of the requesting client; and transmitting the generated distribution package to the requesting client.

22 Claims, 13 Drawing Sheets

(51) Int. Cl.
*G06F 21/62* (2013.01)
*H04L 29/08* (2006.01)
*H04L 29/06* (2006.01)

(56) References Cited

U.S. PATENT DOCUMENTS

| | | | | |
|---|---|---|---|---|
| 8,180,798 | B2* | 5/2012 | Lourdeaux | G06F 17/30867 707/791 |
| 8,838,644 | B2* | 9/2014 | Kandasamy | G06F 21/6218 707/781 |
| 8,850,424 | B2* | 9/2014 | Friedman | G06F 8/61 717/170 |
| 8,903,088 | B2* | 12/2014 | Schultz | H04N 21/6581 380/211 |
| 2003/0172034 | A1* | 9/2003 | Schneck | G06F 21/10 705/54 |
| 2004/0125402 | A1* | 7/2004 | Kanai | G06F 21/608 358/1.15 |
| 2004/0190713 | A1* | 9/2004 | Fu | H04L 9/302 380/30 |
| 2005/0021980 | A1* | 1/2005 | Kanai | G06F 21/608 713/182 |
| 2006/0004669 | A1 | 1/2006 | Ito | |
| 2006/0184530 | A1* | 8/2006 | Song | H04L 63/101 |
| 2006/0184932 | A1* | 8/2006 | Burnley | G06F 8/60 717/174 |
| 2007/0140140 | A1* | 6/2007 | Feeley | H04L 29/06027 370/252 |
| 2007/0288989 | A1* | 12/2007 | Aarnos | G06F 21/53 726/1 |
| 2013/0047145 | A1* | 2/2013 | Cui | G06F 8/68 717/168 |

FOREIGN PATENT DOCUMENTS

| | | | |
|---|---|---|---|
| JP | 2005-332049 | | 12/2005 |
| JP | 2006-018753 | | 1/2006 |
| JP | 2006-025236 | | 1/2006 |
| JP | 2008-123049 | | 5/2008 |
| JP | 2009-026046 | * | 2/2009 |
| JP | 2009026046 | | 2/2009 |
| JP | 2009-086840 | | 4/2009 |
| JP | 2009-026046 | * | 2/2015 |

OTHER PUBLICATIONS

Machine Translation for JP2005_332049, published Dec. 2, 2005, pp. 1-64.
Machine Translation for JP2006_18753, published Jan. 19, 2006, pp. 1- 43.
Machine Translation for JP2006_25236, published Jan. 26, 2006, pp. 1-56.
Machine Translation for JP2008_123049, published May 29, 2008, pp. 1- 65.
International Search Report for International Application No. PCT/JP2011/065184, dated Sep. 13, 2011, pp. 1-2.
Written Opinion of the International Search Authority, dated Mar. 22, 2013, pp. 1- 4.
International Preliminary Report on Patentability, dated Mar. 26, 2013, for International Patent Application PCT/JP2011/065184, filed Jul. 1, 2011, pp. 1-06.
"Microsoft Windows Rights Management Services (RMS) Security Target", dated Jul. 9, 2007, Version 1.0 Science Applications International Corporation, Common Criteria Testing Laboratory, 7125 Columbia Gateway Drive, Suite 300, Columbia, MD, 21046, pp. 1-45.
"Adobe solutions for Protecting Personally Identifiable Information Government Agencies Can Raise Security for Sensitive Data Using Adobe LiveCycle Rights Management ES", dated 2008, Solution Brief, Adobe Systems Incorporated 345 Park Avenue San Jose, CA, pp. 1-4.
"The Benefits of Rights Management a guide to Adobe® LiveCycle® Rights Management ES Software", dated 2008, Technical White Paper, Adobe Systems Incorporated 345 Park Avenue, San Jose, CA, pp. 1-8.
"Adobe® LiveCycle® Rights Management ES2 Manage Usage Rights to Protect Sensitive Information in PDF, Microsoft Office, CAD, and Video Files", dated 2009, Adobe LiveCycle ES2 Datasheet, Adobe Systems Incorporated 345 Park Avenue San Jose, CA, pp. 1-2.
"Adobe LiveCycle Rights Management ES2 Enforce Access Rights and Privileges" dated 2010, (Online) retrieved from the internet on Apr. 11, 2013, at URL>:http://web.archive.org/web/20100725051703/http://www.adobe.com/pro. . . pp. 1-6.
"Windows Rights Manamgement Services", Windows Server 2003 Rights Management Services, (Online), retrieved from the internet on Apr. 11, 2013, at URL>:http://web.archive.org/web/20100831062548/http://www.microsoft.com . . . , pp. 1-2.
"Adobe LiveCycle Rights Management ES2 Capabilites", dated 2010, (Online) retrieved from the internet on Apr. 11, 2013, at URL>:http://web.archive.org/web/20100524034447/http://www.adobe.com/pro. . . , pp. 1-5.
"Windows Rights Management Services 2003 Management PackReadMe", dated 2013,(online) retrieved from the Internet on Apr. 9, 2013 from URL> www.http://technet.microsoft.com/en-us/library/dd262091.aspx, pp. 1-5.
"LiveCycle ES2.5 Overview", dated Oct. 15, 2010, Adobe Systems Incorporated, LiveCycle ES2.5 Version 9.5, pp. 1-68.
English machine translation of Japanese patent JP2009026046 dated Feb. 5, 2009.
International Preliminary Report on Patentability and Written Opinion of the International Searching Authority for Application PCT/JP2011/065184, filed Jul. 1, 2011.
Translation of the International Search Report of PCT/JP2011/065184, filed Jul. 1, 2011.
S. Furuichi et al., "Access Control Policy Management for GUI-based Computer", dated Sep. 15, 2008, Software Development Laboratory, IBM Japan, Total 11 pages.
English Abstract for "Access Control Policy Management for GUI-based Computer", published Sep. 15, 2008, Total 2 pages.
German Office Action, dated Nov. 26, 2015, Application No. 11 2011 103 164.5, Total 7 pages.
Information Materials for IDS, dated Dec. 16, 2014, Total 4 pages.
English Translation for CN101835148A, published Dec. 26, 2012, Total 7 pages.

* cited by examiner

FIG. 3

```xml
<?xml version="1.0" encoding="UTF-8" ?>
<Policy PolicyId="{7B5F16CC-0B5E-4c44-A422-6A25BE78688C}">
    <Description>Policy Demo Scenario #1</Description>
    <Version>4.1</Version>
    <Platform>OS A</Platform>
    <PolicyType>System</PolicyType>
    <Target>
        <Subjects>
            <AnySubject />
        </Subjects>
        <Resources>
            <AnyResource />
        </Resources>
        <Actions>
            <AnyAction />
        </Actions>
    </Target>
    <!-- Group 1 : notepad.exe -->
    <Rule RuleId="run:xxx:rule1:Default">
        <Description>Deny accessing clipboard, printer and removable drive</Description>
        <Subjects>
            <Subject>
                <AttributeValue DataType="file:path">notepad.exe</AttributeValue>
            </Subject>
        </Subjects>
        <Resources>
            <Resource DataType="clipboard" Lib="SBLCLIP.DLL">
                <!-- Notepad can not copy any data to the clipboard -->
                <AttributeValue DataType="clipboard:type">any</AttributeValue>
                <Action Effect="Deny">write</Action>
                <Obligation DataType="Popup" />
                <!-- Popup message -->
            </Resource>
            <Resource DataType="print" Lib="SBLPRINT.DLL" Target="Local">
                <!-- Deny printing to printer which has IP address xxx.xxx.xxx.xxx -->
                <AttributeValue DataType="printer:type">any</AttributeValue>
                <Action Effect="Deny">print</Action>
                <Obligation DataType="Popup" />
            </Resource>
            <Resource DataType="file" Lib="SBLFILE.DLL">
                <!-- Deny writing to removable drive -->
                <AttributeValue DataType="file:type">Removable</AttributeValue>
                <Action Effect="Deny">write</Action>
                <Obligation DataType="Popup" />
            </Resource>
        </Resources>
        <Obligations>
            <Resources />
        </Obligations>
    </Rule>
    <!-- Group 0 (Default Policy) -->
    <Rule RuleId="run:xxx:rule1:Default">
        <Description>No access control</Description>
        <Subjects>
            <AnySubject />
        </Subjects>
        <Resources />
        <Obligations>
            <Resources />
        </Obligations>
    </Rule>
</Policy>
```

Rule (Group1):
- Subjects
- Resources
- Obligations

FIG. 4

```xml
<Rule RuleId="urn:xxx:rule:Explorer">
    <Description>Explorer's policy, not allowed to access LDMROOT</Description>
    <Subjects>                                                                  ⎫
        <Subject>                                                               ⎪
            <AttributeValue DataType="file:path">explorer.exe</AttributeValue>  ⎬ Subjects
        </Subject>                                                              ⎪
    </Subjects>                                                                 ⎭
    <Resources>                                                                 ⎫
        <!-- Deny read/write from/to LDMROOT -->                                ⎪
        <Resource DataType="file" Lib="SBLFILE.DLL">                            ⎪
            <AttributeValue DataType="file:path">%LDMROOT%¥*.*</AttributeValue> ⎪
            <Action Effect="Deny">write</Action>                                ⎪
            <Obligation DataType="Popup" />                                     ⎪
            <!-- Popup message -->                                              ⎬ Resources
        </Resource>                                                             ⎪
        <Resource DataType="file">                                              ⎪
            <AttributeValue DataType="file:path">%LDMROOT%¥*.*</AttributeValue> ⎪
            <Action Effect="Deny">read</Action>                                 ⎪
        </Resource>                                                             ⎪
    </Resources>                                                                ⎭
</Rule>
```

(A)

```xml
<Rule RuleId="run:ibm:rule:clipboard">
    <Description>Deny interprocess copy and paste</Description>
    <Subjects>                                                                      ⎫
        <AnySubject />                                                              ⎬ Subjects
    </Subjects>                                                                     ⎭
    <Resources>                                                                     ⎫
        <Resource DataType="clipboard" Lib="SBLCLIP.DLL" Target="Global">           ⎪
            <!-- Deny copy&paste to other process -->                               ⎪
            <AttributeValue DataType="clipboard:owner">InProcess</AttributeValue>   ⎬ Resources
            <Action Effect="Deny">read</Action>                                     ⎪
            <Obligation DataType="Popup" />                                         ⎪
            <!-- Popup message when rejected -->                                    ⎪
        </Resource>                                                                 ⎪
    </Resources>                                                                    ⎭
    <Obligations>                                                                   ⎫
        <Resources>                                                                 ⎪
            <Resource DataType="clipboard">                                         ⎪
                <!-- Delete data in clipboard when the window is closed -->         ⎬ Obligations
                <Obligation DataType="Cleanup" />                                   ⎪
            </Resource>                                                             ⎪
        </Resources>                                                                ⎪
    </Obligations>                                                                  ⎭
</Rule>
```

(B)

GENERATING A DISTRUBITION PACKAGE HAVING AN ACCESS CONTROL EXECUTION PROGRAM FOR IMPLEMENTING AN ACCESS CONTROL MECHANISM AND LOADING UNIT FOR A CLIENT

TECHNICAL FIELD

The present invention relates to an information leakage preventive technique, and more specifically, to a data distribution apparatus, a data distribution system, a client apparatus, a data distribution method, a data reception method, a program, and a recording medium that prevent information leakage from a data distribution destination.

BACKGROUND ART

In recent years, due to design collaboration inside and outside companies and globalization of OEM (Original Equipment Manufacturing), overseas expansion of development/manufacturing bases has been advanced. Furthermore, due to the widespread use of cloud computing, geographical gaps between bases and between an orderer and a contractor have been narrowed, and circulation of technical data through a network has become active more and more. Under such circumstances, the risk of unauthorized release of valuable technical data has been significantly increasing. Thus, data security measures and ensuring traceability have become more important.

In particular, in manufacturing industries in which operations for placing orders with subcontractors and sub-subcontractors frequently occur, prevention of secondary leakage of design/manufacturing data from contractors is a major issue. Some services can be outsourced using cloud services. In areas such as three-dimensional CAD (Computer Aided Design), NC machining (Numerical Control machining), and medicine, however, many services requiring processing by local terminals still exist. Thus, in many cases, confidential data may be allowed to be saved on local terminals of contractors.

Since confidential data saved on a local terminal of a contractor is normally out of control of an orderer, it is desirable that technical preventive measures against unauthorized use or leakage should be taken. In particular, it is desirable that confidential data saved on a local terminal of a contractor should become unusable after the term of the contract expires. As the above-mentioned technical measures, for example, Japanese Unexamined Patent Application Publication No. 2009-26046 (PTL 1) refers to a technique for restricting access to a storage device by filtering a read instruction or a write instruction issued to a device driver of the storage or an input/output interface.

PTL 1 also discloses preventive measures against secondary leakage of data, in which in order to prevent secondary leakage of data from an organization at a data distribution destination to a third party, from an execution environment construction image file dedicated to distribution data processing including an operating system and an application for constructing an execution environment dedicated to distribution data separated from an execution environment of non-distribution data by virtualization means provided in a data distribution destination computer, installation of the operating system and application is performed, and the execution environment dedicated to distribution data processing and separated from the execution environment of the non-distribution data by the virtualization means provided in the distribution destination computer is constructed.

Similarly, Japanese Unexamined Patent Application Publication No. 2009-86840 (PTL 2) discloses an information processing apparatus that includes an administrator environment including an operating system and a specific application, the operating system being for data management constructed in a manner separated from an operating system environment accessed by a user by virtualization means provided in the information processing apparatus; and means for operating the application using a method in which the operating system environment accessed by the user transmits input information of a keyboard or the like to the environment for the management and receives, as reply thereof, information of a display screen from the environment for the management.

As commercial DRM (Digital Rights Management) products, software applications implementing an access control function inside an application program are also provided. For example, RMS (Rights Management Services) by Microsoft® (NPL 1) and LiveCycle® Rights Management ES2 by Adobe® (NPL 2) are techniques in which an application itself interprets security policies including the authority to perform editing and the authority to perform printing set for individual documents and restricts various operations such as browsing, editing, copying, and printing.

CITATION LIST

Patent Literature

PTL 1: Japanese Unexamined Patent Application Publication No. 2009-26046
PTL 2: Japanese Unexamined Patent Application Publication No. 2009-86840

Non Patent Literature

NPL 1: "Windows Rights Management Services", [online], [searched on Sep. 10, 2010], Internet<URL; http://www.microsoft.com/windowsserver2003/technologies/rightsmgmt/default.mspx>
NPL 2: "Adobe LiveCycle Rights Management ES2", [online], [searched on Sep. 10, 2010], Internet<URL; http://www.adobe.com/products/livecycle/rightsmanagement/>

SUMMARY OF INVENTION

Technical Problem

However, in the related arts disclosed in PTL 1 and PTL 2, a distribution destination computer needs to include virtualization means for constructing an execution environment dedicated to distribution data processing separated from a normal execution environment. Thus, these techniques can be used only in limited environment. Alternatively, installation of an operating system and an application is required in order to construct the execution environment dedicated to the distribution data processing separated from the normal execution environment in the distribution destination computer, which imposes a burden on the distribution destination. Furthermore, since an operator generally performs many operations including transmission and reception of electronic mails and browsing of web pages concurrently with dealing with distribution data, inconvenience of frequent use of virtual OSs is not negligible in the configuration using a virtualization technique.

Furthermore, in the techniques implementing the access control function inside an application as disclosed in NPL 1 and NPL 2, unfortunately, only limited applications can be protected. Thus, only limited types of data can be used. Therefore, all the services cannot be comprehensively controlled unless all the service applications are supported.

The present invention has been made in view of the problems of the related arts described above, and it is an object of the present invention to provide a data distribution apparatus and a data distribution system that control the information flow of various data by distributing data in the form of a distribution package including an appropriate access control mechanism executing access control for distribution data, and in addition, that are capable of preventing information leakage from a distribution destination without restricting the usage environment of the distribution destination and without placing excessive workload on the distribution destination.

It is another object of the present invention to provide a client apparatus that receives a distribution package from the data distribution apparatus, a data distribution method performed by the data distribution apparatus or the data distribution system, a data reception method performed by the client apparatus, a program for implementing the data distribution apparatus or the data distribution system, and a recording medium storing the program.

Solution to Problem

The present invention has been made in view of inconvenience of the related arts described above. The present invention provides a data distribution apparatus for providing a distribution package and a data distribution system including a plurality of computers, the apparatus and the system having characteristics described below.

A data distribution apparatus or a data distribution system according to the present invention includes a program storage unit storing an access control execution program for implementing an access control mechanism and a loading unit on a client, adapting the access control execution program to an environment of the client, the access control mechanism controlling access to a resource from a process in a manner that depends on a given policy, the loading unit loading distribution data included in a distribution package to a protected storage area. The data distribution apparatus or data distribution system detects an environment of a requesting client requesting reception of the distribution data, reads distribution data to be distributed and a security policy specified for the distribution data, transmits to the requesting client, a distribution package including the distribution data, the security policy, and the access control execution program adapting to the environment of the requesting client.

Furthermore, according to the present invention, a client apparatus that receives the distribution package can be provided. The client apparatus includes a request transmission unit transmitting a reception request for distribution data to the data distribution apparatus and an environmental information transmission unit transmitting environmental information describing an environment of the client apparatus. Furthermore, according to the present invention, a data distribution method performed by the data distribution apparatus or a data distribution system, a data reception method performed by the client apparatus, a program for implementing the data distribution apparatus or the data distribution system, and a recording medium storing the program can be provided.

Advantageous Effects of Invention

With the configuration described above, a registrant of distribution data is capable of delivering the distribution data to a distribution destination while imposing a specific security policy on an operation environment of the distribution destination. The distribution data is stored under the local environment of the distribution destination. For distribution data existing under the local environment, access to a resource from a running process is controlled by the access control mechanism in accordance with a security policy, so that the range where the distribution data can be circulated can be restricted. Thus, for example, information leakage by unintentional data release after authenticated information provision to a business partner, that is, secondary leakage, can be prevented. Furthermore, with the configuration described above, compulsory introduction and setting of complicated special control software to a distribution destination is not required, and application to various data and various applications can be achieved.

BRIEF DESCRIPTION OF DRAWINGS

FIG. 3 is a diagram exemplifying the data structure of a security policy used in the first embodiment of the present invention.

FIG. 4 is a diagram exemplifying part of the data structure of a security policy used in the first embodiment of the present invention.

DESCRIPTION OF EMBODIMENTS

Hereinafter, embodiments of the present invention will be explained. The present invention is not limited to the embodiments described below. In the embodiments described below, a data distribution server that implements a server function of packaging data to be distributed (hereinafter, referred to as distribution data) and distributing the packaged distribution data will be explained as an example of a data distribution apparatus.

Figure 1:
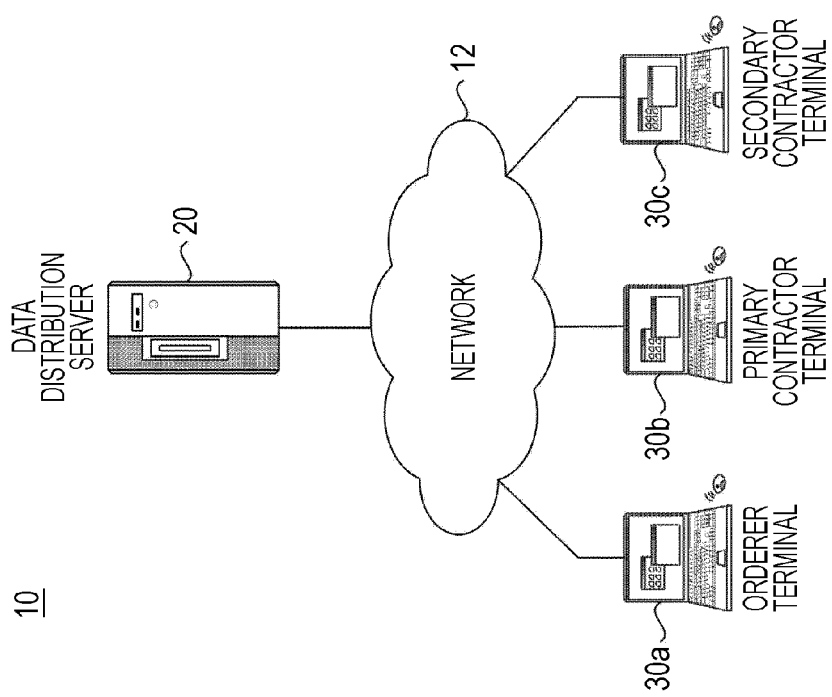
FIG. 1 is a schematic diagram of a data processing system including a data distribution server according to a first embodiment of the present invention.

FIG. 1 is a schematic diagram of a data processing system including a data distribution server according to a first embodiment of the present invention. A data processing system 10 includes a data distribution server 20 that implements a server function of distributing packaged data and one or more client apparatuses 30 connected over a network 12 to the data distribution server 20. The network 12 is not particularly limited. However, the network 12 includes, for example, LANs (Local Area Networks) using TCP/IP and Ethernet®, VPNs (Virtual Private Networks), WANs (Wide Area Networks) using dedicated lines, and the Internet.

By way of exemplification, the data processing system 10 illustrated in FIG. 1 is configured as a service system for executing all the services while data transfer is performed between the client apparatuses 30 via the data distribution server 20 and local operations are performed by the individual client apparatuses 30. In FIG. 1, an orderer terminal 30a that is used by an orderer who places an order for a service using distribution data, a primary contractor terminal 30b, and a secondary contractor terminal 30c are represented as the client apparatuses 30. The primary contractor terminal 30b is a terminal that is used by a primary contractor who executes an undertaken service using distribution data in accordance with a request from an orderer. Meanwhile, the secondary contractor terminal 30c is a terminal that is used by a secondary contractor who undertakes, from the primary contractor who executes the undertaken service in accordance with the request from the orderer, part of the service undertaken by the primary contractor.

In general, the client apparatuses 30 are configured as general-purpose computers, such as tower, desktop, laptop, or tablet personal computers, work stations, netbooks, and PDAs (Personal Data Assistances). More specifically, the client apparatuses 30 each include a central processing unit (CPU) such as a single core processor or a multi-core processor, a cache memory, a RAM, a network interface card (NIC), a storage device, and the like. The client apparatuses 30 each operate under the control of an appropriate operating system (hereinafter, referred to as an OS) such as Windows®, UNIX®, Linux®, Mac OS®, AIX®, or the like. In this embodiment, preferably, an OS based on a graphical user interface (hereinafter, referred to as a GUI) that provides a desktop environment such as a window system is loaded in the client apparatuses 30. The client apparatuses 30 according to this embodiment also each implement a web browser operating on the OS.

In general, the data distribution server 20 is configured as a general-purpose computer such as a personal computer, a work station, a rack-mount or blade server, a mid-range computer, a main-frame, or the like. More specifically, the data distribution server 20 includes a CPU such as a single core processor or a multi-core processor, a cache memory, a RAM, an NIC, a storage device, and the like. The data distribution server 20 operates under the control of an appropriate OS such as Windows®, UNIX®, Linux®, or the like.

When receiving a registration request for data necessary for an ordering service from the orderer terminal 30a, the data distribution server 20 registers the data necessary for the service so as to be distributed to a contractor. Meanwhile, when receiving a reception request for data from the primary contractor terminal 30b or the secondary contractor terminal 30c operated by a contractor who undertakes an ordered service, the data distribution server 20 performs appropriate user authentication and distributes the data necessary for the service to the terminal Similarly, in the case where the primary contractor places an order with the secondary contractor for part of the undertaken service, the data distribution server 20 is capable of receiving from the primary contractor terminal 30b distribution data or part or all of secondary data generated by processing the distribution data, and distributing the received data to the secondary contractor terminal 30c. The data distribution server 20 according to this embodiment implements, for example as a web application, a function of receiving and distributing the above-described data.

Distribution data to be distributed is not particularly limited. However, distribution data to be distributed includes files in general-purpose formats, such as various files to be used by a word processor, a spreadsheet, drawing, presentation, a database management system, and various applications, such as DTP (Desktop Publishing), numerical analysis software, CAD, NC machining, CT (computed tomography), and MRI (magnetic resonance imaging), text files, document files, audio files, movie files, and the like. Furthermore, distribution data may be a file including a query result extracted by a specific query from a database connected to the data distribution server 20.

In accordance with a reception request for distribution data from the client apparatus 30, the data distribution server 20 distributes packaged distribution data to the requesting client apparatus 30. Normally, when distribution data is directly distributed as a file to the client apparatus 30, the distribution data can be freely circulated in an independent manner. Thus, in the case where distribution data includes confidential information, even if encoding of the distribution data can be performed, this may not be desirable from the viewpoint of data security measures. Under such circumstances, in this embodiment, as described later, the data distribution server 20 performs distribution by including an access control mechanism that executes access control in accordance with a specific security policy in a distribution package.

In this embodiment, the access control mechanism to be included in distribution data is located at the level between an OS and an application and is capable of executing access control in fine granularity, such as in units of processes, in units of users, and in units of files, in a flexible manner in accordance with user context. The access control mechanism according to this embodiment is capable of prohibiting access to resources, such as storing and printing of non-permitted data, copy and paste between processes through a clipboard during data operation, and screen copying using print screen. Hereinafter, data distribution processing using a distribution package including an access control mechanism according to an embodiment of the present invention will be explained in more detail.

Figure 2:
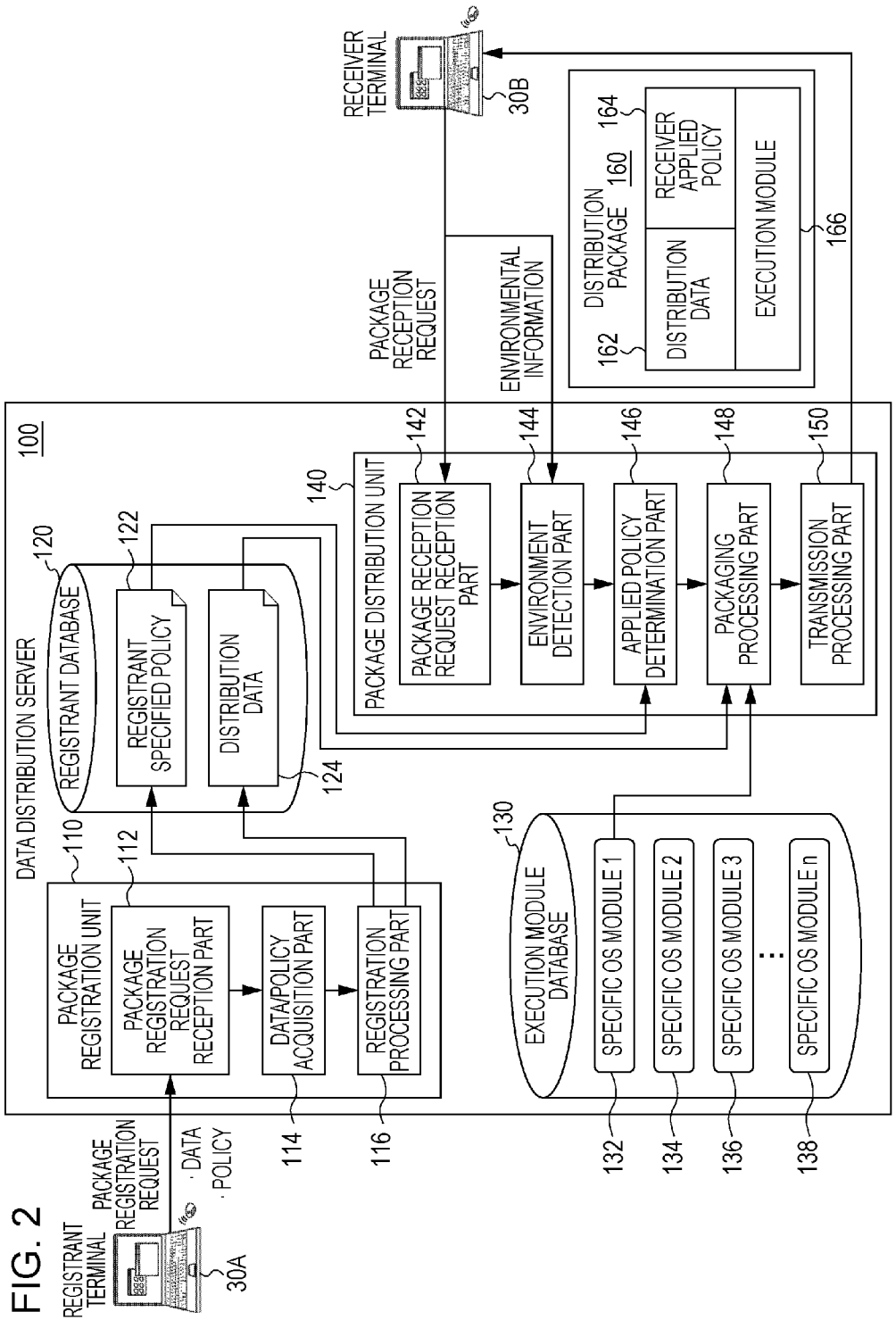
FIG. 2 is a functional block diagram implemented on the data distribution server according to the first embodiment of the present invention.

FIG. 2 illustrates a functional block implemented on a data distribution server according to a first embodiment of the present invention. A functional block 100 of the data distribution server 20 illustrated in FIG. 2 includes a package registration unit 110 that registers distribution data, to which a specific security policy is applied, so as to be distributed and a registrant database 120 that stores a security policy 122 and distribution data 124 registered by a registrant.

Here, a user who registers distribution data is referred to as a "registrant", and a user who receives registered distribution data is referred to as a "receiver". Hereinafter, data distribution processing between the registrant and the receiver will be explained. That is, the orderer, the primary contractor, and the secondary contractor explained with reference to FIG. 1 each may serve as a registrant or a receiver. Furthermore, in the explanation provided below, unless otherwise particularly stated, a user of the data processing system 10 logs into the data processing system 10 by operating the client apparatus 30 and a specific user authentication is accomplished.

The registrant database 120 defines a data storage unit according to this embodiment and provides a storage area to which a user who may serve as a registrant registers distribution data. In the registrant database 120, for example, databases for individual users are provided.

The client apparatus 30 on the registrant side (hereinafter, referred to as a registrant terminal 30A) transmits to the data distribution server 20 a package registration request for distribution data. The package registration request may include distribution data, a security policy specified for the distribution data (hereinafter, a security policy specified by a registrant is referred to as a registrant specified policy), and distribution destination information describing a distribution destination to which the distribution data is permitted to be distributed.

For example, uploading of distribution data is specified through a web browser of the registrant terminal 30A. The distribution data is read from a local storage area of the registrant terminal 30A and is transmitted to the data distribution server 20. Similarly, for a security policy, individual items are input through a web browser. The input values of the individual items are configured, for example, as an XML (eXtensible Markup Language) file and are transmitted to the data distribution server 20. An upload form for an upload instruction for the distribution data and a GUI for setting a security policy are provided, for example, as a web page in such a manner that the web browser of the registrant terminal 30A can interpret.

More specifically, the package registration unit 110 includes a package registration request reception part 112 that receives a package registration request, a data/policy acquisition part 114, and a registration processing part 116. The data/policy acquisition part 114 acquires distribution data, a registrant specified policy, and distribution destination information regarding a package registration request. In the case where distribution data regarding the package registration request is secondary data of different distribution data (here, data that is generated by processing the distribution data), the data/policy acquisition part 114 may also acquire a policy specified for the original distribution data and merge the acquired policy and the registrant specified policy together. The registration processing part 116 stores the acquired distribution data 124, registrant specified policy 122, and distribution destination information into the registrant database 120, and registers the distribution data so as to be distributed.

In the embodiment described here, since distribution data, a registrant specified policy, and distribution destination information are each transmitted from the registrant terminal 30A to the data distribution server 20, the data/policy acquisition part 114 receives these data transmitted from the registrant terminal 30A, for example, in accordance with an HTTP protocol. However, a method for specifying distribution data, a registrant specified policy, and a distribution destination is not particularly limited.

In a different embodiment, all the distribution data, registrant specified policy, and distribution destination or any one of the distribution data, registrant specified policy, and distribution destination may be stored in advance in the data distribution server 20, and an identifier identifying the distribution data, the registrant specified policy, or the distribution destination information may be delivered from the registrant terminal 30A to the data distribution server 20. In this case, the data/policy acquisition part 114 reads data identified by the identifier from a storage area that can be accessed by the data distribution server 20. In a different embodiment, all the distribution data, registrant specified policy, and distribution destination information or any one of the distribution data, registrant specified policy, and distribution destination information may be prepared as a resource on a network, and an URI (Universal Resource Identifier) in which the distribution data, the registrant specified policy, or the distribution destination information is stored may be delivered from the registrant terminal 30A to the data distribution server 20. In this case, the data/policy acquisition part 114 acquires the data from a resource identified by the URI.

A security policy defines information flow control between processes in a computer and/or between computers for distribution data included in a package. Here, information flow control defines an area in which information can be circulated between processes in a specific computer and between computers connected to each other. For example, a security policy defines prohibition or permission of reading of distribution data or secondary data of the distribution data, storing of the data into a removable medium, storing of the data into a non-protected storage area of a local drive, printing of the data, copy and paste between processes through a clipboard in a state where the data is opened, screen copying through a clipboard in a state where a window of the data is in an active state, and the like.

FIGS. 3 and 4 are diagrams illustrating the data structure of a security policy used in the first embodiment of the present invention. Although the format of a security policy is not particularly limited, FIG. 3 exemplifies a security policy described in an XML format. In FIG. 3, a portion between Rule tags represented by "Rule (Group 1)" represents a set of policy. In the example illustrated in FIG. 3, a policy for a "notepad" is described.

In a portion between Subjects tags, a subject (process) to which the policy is applied is specified by Subject tags. In the example illustrated in FIG. 3, a process "notepad.exe" is specified as a subject. In a portion between Resources tags, a policy for access to a resource by the subject (process) is described by Resource tags. In the example illustrated in FIG. 3, a description in provided in which access "write" to a resource "clipboard", access "print instruction" to a resource "printer", access "write" to a resource "removable medium" by the process "notepad.exe" are each prohibited. In a portion between Obligations tags, obligation to be imposed after termination of a process or during running of a process is described by Resource tags.

FIG. 4 illustrates part of the data structure of another security policy described in the XML format. In the example illustrated in FIG. 4(A), a policy for a file manager (Windows® Explorer) is described, and a process "explorer.exe"

is specified as a subject. In FIG. 4, "%LDMROOT%" represents a protected folder to which a distribution package is loaded, which will be described later, (hereinafter, referred to as a protected folder). In a portion between Resources tags, a description in which all (*.*) the access "write and read" to a resource "protected folder" by the process "explorer.exe" is prohibited is provided by Resource tags. In another example, a description may be provided in which access to a file including a specific extension or a specific file in a protected folder is controlled.

In the example illustrated in FIG. 4(B), a policy for copy and paste between all the desired processes is described. In a portion between Subjects tags, a policy for a desired process is described by an AnySubject tag. In a portion between Resources tags, a description is provided in which the contents of a clipboard written by a different process are prohibited from being read by a desired process. In a portion between Obligations tags, a clipboard is specified by Resource tags, and cleanup of the clipboard is obliged to be performed after termination by an Obligation tag. Obligations imposed after termination of a process or during running of a process also include compulsion of operation log recording or the like.

With the use of the security policies exemplified in FIGS. 3 and 4, access to a resource by a process operating on the client apparatus 30 is controlled. As a result, circulation of data between processes is controlled. Furthermore, circulation of data from the client apparatus through a different process such as a removable medium, a non-protected folder, an FTP (File Transfer Protocol), or the like to an external computer is controlled. In addition, by describing inside a security policy, for a process of a web browser, an area of distribution data and secondary data of the distribution data that can be registered again from a distribution destination to the data distribution server 20, circulation of data to an external computer after direct distribution to a distribution destination through the data distribution system can also be controlled. Although the security policies used for Windows® are illustrated in FIGS. 3 and 4 by way of example, similar description can be made for different OSs.

Distribution destination information includes information identifying the client apparatus 30 or a user that can be permitted as a distribution destination of distribution data. Distribution destination information may include, for example, a user ID identifying a user for whom distribution is permitted, a client ID identifying a client terminal for which distribution is permitted, a group ID identifying a group of users or clients for which distribution is permitted, a unique identifier (an OS serial number, a machine UUID (Universally Unique IDentifier), a machine serial number, etc.) uniquely allocated to the client apparatus 30 for which distribution is permitted, an IP address allocated to the client apparatus 30 for which distribution is permitted, a MAC address allocated to an NIC of the client apparatus 30 for which distribution is permitted, and the range of IP addresses allocated to a client group for which distribution is permitted, or a combination of some of the information mentioned above.

Referring back to FIG. 2, when distribution data, a registrant specified policy, and distribution destination information are registered to the registrant database 120, a distribution package of the distribution data enters a state in which the distribution data can be distributed. The functional block 100 of the data distribution server 20 further includes an execution module database 130 that stores an access control execution module to be included in a distribution package (hereinafter, may be referred to as an execution module) and a package distribution unit 140 that packages distribution data registered so as to be distributed and a access control execution module and distributes the packaged distribution data.

The access control execution module is a program for implementing an access control mechanism, which will be described later, on a client apparatus and for executing access control on the client apparatus in accordance with the security policy described above. The access control execution module depends on the type of an OS. Thus, the execution module database 130 stores the access control execution module for each type of OS. As access control execution modules for specific OSs, for example, Windows® 132, Linux® 134, MAC OS® 136, AIX® 138 are prepared. The execution module database 130 defines a program storage unit according to this embodiment.

The client apparatus 30 on a receiver side (hereinafter, referred to as a receiver terminal 30B) accesses the data distribution server 20, and transmits a package reception request as well as a distribution data ID identifying desired distribution data. Here, the distribution data ID can be transmitted from a registrant to a receiver using different means, such as, for example, electronic mail. A user is able to transmit a package reception request including the ID of desired distribution data to the data distribution server 20 by clicking a direct link to a web page in the electronic mail from which distribution data is to be downloaded. Alternatively, the distribution data ID may be transmitted to a receiver in such a manner that the distribution data ID is included in a web page in which distribution data that can be received by the user are listed. In this case, by selecting a desired one piece of the listed distribution data, the user is able to transmit a package reception request including a desired distribution data ID to the data distribution server 20.

More specifically, the package distribution unit 140 includes a package reception request reception part 142 that receives a package reception request, an environment detection part 144, an applied policy determination part 146, a packaging processing part 148, and a transmission processing part 150. The environment detection part 144 acquires environmental information in which the type of an OS used by the receiver terminal 30B serving as a requesting source is described, and detects the environment of the receiver terminal 30B. Here, the environment of the receiver terminal 30B includes the type of an OS configuring the receiver terminal 30B, and in a broader sense, includes the integral including the combination of software such as an OS, a browser, and an application and hardware such as a drive and individual configuration states and settings.

An OS used by the receiver terminal 30B may be easily determined on the basis of an identifier of a user agent reported in, for example, an HTTP request. Furthermore, in order to detect detailed environment other than the type of an OS, a program of an applet or the like to collect system information of the client apparatus 30 with consent of the user and transmit the system information to the data distribution server 20 may be provided to the receiver terminal 30B, and environmental information may be acquired using the program. In this case, the environment detection part 144 acquires from the receiver terminal 30B environmental information in which system information of the receiver terminal 30B is described.

The system information described above may include information identifying a client, such as the name of a computer, an OS serial number, a machine UUID, and a machine serial number, the volume in which the system is installed, the drive number of a different volume, drive configuration of a Windows® directory, a system directory, a program directory, or the like, the encoding attributes of a main folder, local resource information, such as a local printer name, and the like. Information identifying a client may be used, for example, when a client for which distribution is permitted is restricted or when a machine by which a distribution package can be loaded is restricted. The drive configuration is used when a path for creating a protected folder in which distribution data is loaded is determined The encoding attributes can be used when, for generation of a protected folder, it is determined whether or not encoding is to be separately performed for a file in the protected folder.

The applied policy determination part 146 appropriately corrects a registrant specified policy in the registrant database 120 in such a manner that the registrant specified policy fits the environment of the receiver terminal 30B detected by the environment detection part 144, and determines a security policy to be actually included into a distribution package (hereinafter, referred to as a receiver applied policy). As the correction to fit the environment of the receiver terminal 30B, the path of a folder in which the distribution data described above is loaded, the file name of a process, the policy particular to an OS are corrected. For example, since the file manager of Windows® is Windows® explorer, the file manager of MAC OS® is Finder UNIX®, and the file manager of Linux® is Dolphin or Natilus, information on a process to which a policy is applied can be corrected in accordance with the type of OS.

The packaging processing part 148 acquires distribution data in the registrant database 120, a receiver applied policy determined by the applied policy determination part 146, and an access control execution module that fits the environment in the execution module database 130. Preferably, the packaging processing part 148 encodes at least the distribution data and generates packaged distribution data including the distribution data, the receiver applied policy, and the access control execution module. A distribution package 160 is provided, for example, as a file in an execution format including distribution data 162, a receiver applied policy 164, and an access control execution module 166. The transmission processing part 150 transmits the generated distribution package 160 to the receiver terminal 30B serving as a reception requesting source for distribution data.

As an encoding key used for encoding distribution data in a distribution package, for example, a public key of the personal certificate of the receiver terminal 30B may be used. However, an encryption key is not particularly limited. In this embodiment, a common key exchanged between the data distribution server 20 and the receiver terminal 30B in advance or afterwards may be used. Furthermore, an encryption method is not particularly limited. Various common key encryption methods and public key encryption methods may be adopted. Furthermore, although an explanation has been provided in which distribution data is encoded when being packaged by the data distribution server 20 in the embodiment described here, distribution data itself may be encoded by the registrant terminal 30A in a different embodiment. In this case, similarly, a public key of the receiver terminal 30B or a common key exchanged between the registrant terminal 30A and the receiver terminal 30B in advance or afterwards may be used.

The functional block 100 of the data distribution server 20 illustrated in FIG. 2 is implemented by reading a program from a computer-readable recording medium such as an HDD, loading the program on a memory, executing the program, and controlling the operation of individual hardware resources.

Figure 5:
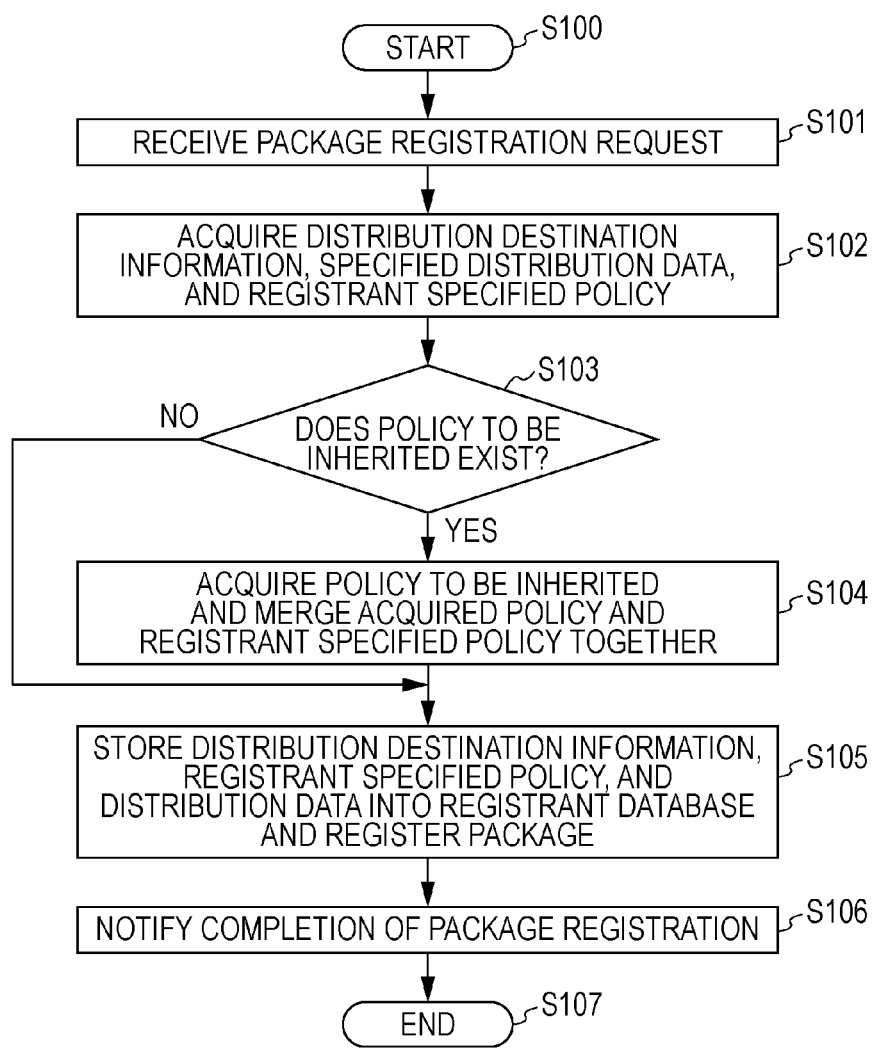
FIG. 5 is a flowchart illustrating a package registration process performed by a package registration unit in the data distribution server according to the first embodiment of the present invention.

Hereinafter, a package registration request and processing for the package reception request will be explained in more detail with reference to FIGS. 5 and 6. FIG. 5 is a flowchart illustrating a package registration process performed by the package registration unit in the data distribution server according to the first embodiment of the present invention. The process illustrated in FIG. 5 starts in step S100 in response to the issuance of a package registration request from the client apparatus 30 to the data distribution server 20.

In step S101, the package registration unit 110 receives a package registration request issued from the client apparatus 30. In step S102, the package registration unit 110 acquires distribution data, a registrant specified policy, and distribution destination information regarding the request. In step S103, the package registration unit 110 determines whether or not a policy to be inherited exists. Here, when distribution data regarding the request is found to be secondary data of different distribution data, it is determined that a policy to be inherited exists. When it is determined in step S103 that a policy to be inherited exists (YES), the process proceeds to step S104. In step S104, the package registration unit 110 acquires a security policy specified for distribution data serving as a parent, and merges the acquired security policy and the registrant specified policy for the registration request together. Then, the process proceeds to step S105. Meanwhile, when it is determined in step S103 that no policy to be inherited exists (NO), the process directly proceeds to step S105.

In step S105, the package registration unit 110 stores the distribution data, the registrant specified policy, and the distribution destination information into the registrant database 120, and registers a distribution package so as to be distributed. In step S106, the package registration unit 110 sends an acknowledge response to the package registration request and notifies that the package registration processing has been successfully completed.

Figure 6:
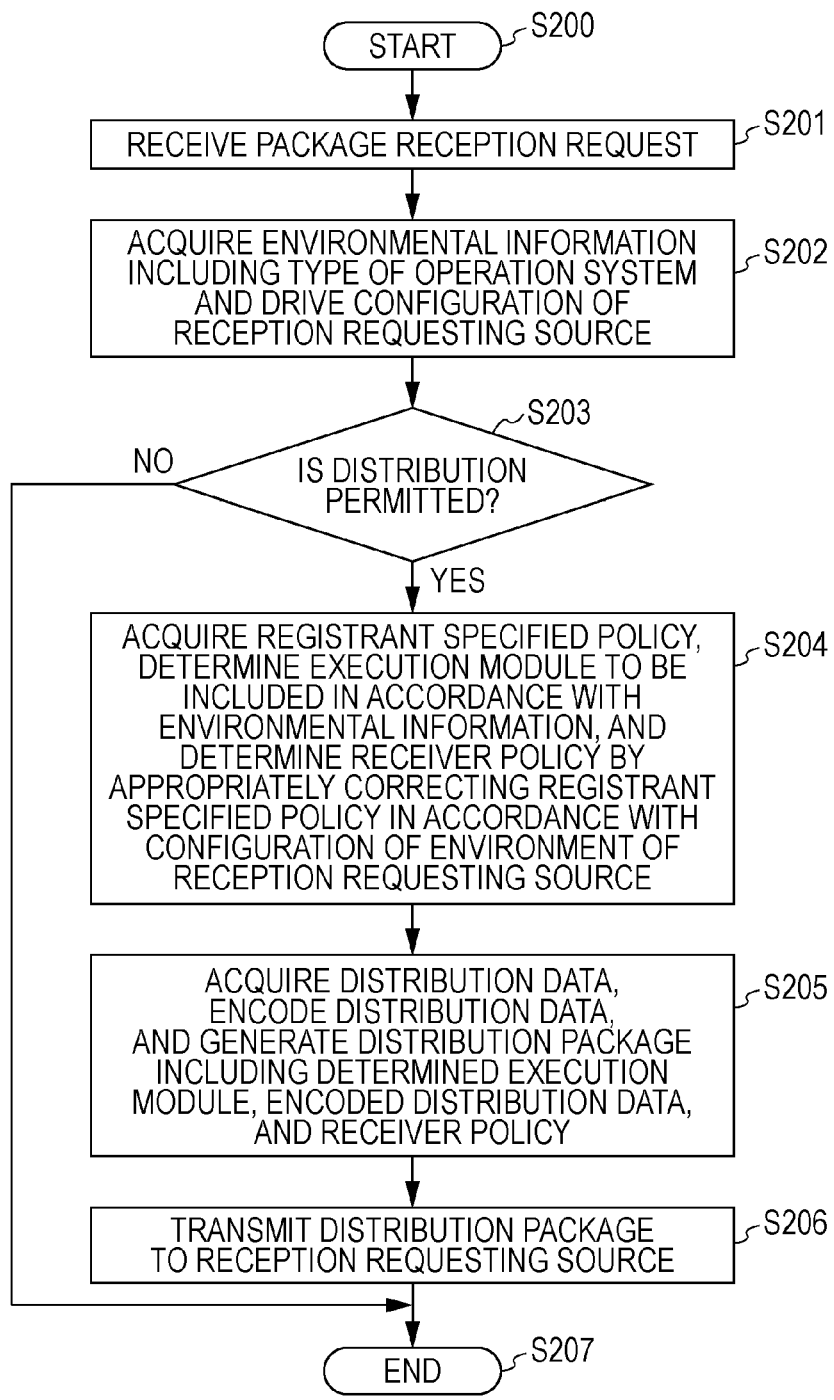
FIG. 6 is a flowchart illustrating a package distribution process performed by the package distribution unit in the data distribution server according to the first embodiment of the present invention.

FIG. 6 is a flowchart illustrating a package distribution process performed by the package distribution unit in the data distribution server according to the first embodiment of the present invention. The process illustrated in FIG. 6 starts in step S200 in response to the issuance of a package reception request from the client apparatus 30 to the data distribution server 20. In step S201, the package distribution unit 140 receives a package reception request from the client apparatus 30. In step S202, the package distribution unit 140 acquires environmental information including the type of an OS, drive information, and the like from the client apparatus 30, and detects the environment of the client apparatus 30.

In step S203, the package distribution unit 140 determines, by referring to distribution destination information in the registrant database 120 associated with distribution data regarding the reception request, whether or not distribution to the requesting source is permitted. When it is determined in step S203 that distribution to the requesting source is not permitted (NO), the process branches off to step S207, in which the process is terminated. Here, a request from a user or a client who does not meet conditions for distribution permission inside the distribution destination information is excluded. Meanwhile, when it is determined in step S203 that distribution to the requesting source is permitted (YES), the process proceeds to step S204.

In step S204, the package distribution unit 140 acquires a registrant specified policy associated with the distribution data regarding the reception request, determines an access control execution module corresponding to the environment of the reception requesting source among one or more access control execution modules stored in the execution module database 130 in accordance with the environmental information, and determines a receiver applied policy by appropriately correcting the registrant specified policy in accordance with the environment of the reception requesting source. In step S205, the package distribution unit 140 acquires the distribution data regarding the reception request, encodes the acquired distribution data, and packages the determined execution module, the encoded distribution data, and the determined receiver applied policy to generate a distribution package. In step S206, the package distribution unit 140 transmits the generated distribution package to the client apparatus 30 serving as the reception requesting source. In step S207, the process is terminated.

Figure 7:
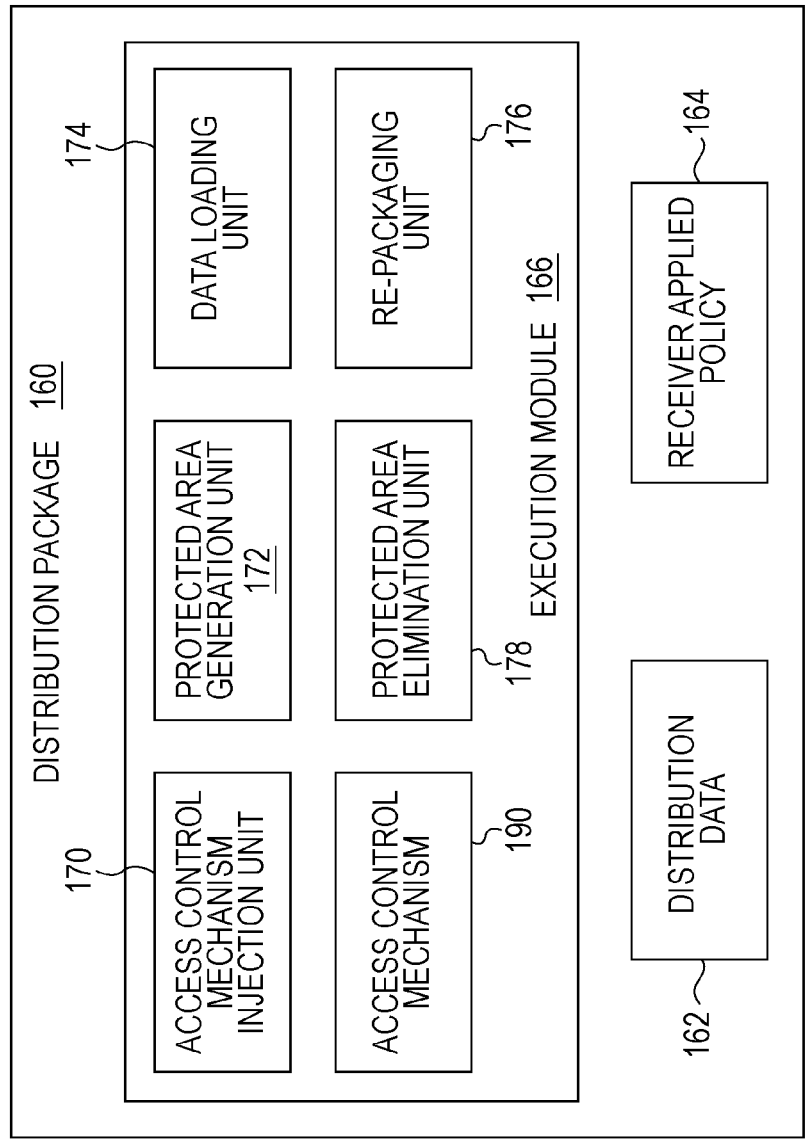
FIG. 7 is a detailed functional block diagram of a distribution package distributed to a client apparatus according to the first embodiment of the present invention.

Hereinafter, processing performed by the client who receives a distribution package will be explained. FIG. 7 is a diagram illustrating the detailed functional block of a distribution package distributed to the client apparatus in the first embodiment of the present invention. The distribution package illustrated in FIG. 7 includes the distribution data 162, the receiver applied policy 164, and the access control execution module 166. More specifically, the execution module 166 includes program code for implementing an access control mechanism injection unit 170, a protected area generation unit 172, a data loading unit 174, a re-packaging unit 176, a protected area elimination unit 178, and an access control mechanism 190 on the client apparatus 30.

The access control mechanism 190 is configured as a library that monitors an API (Application Programming Interface) call by a process operating on the client apparatus 30 and executes access control. Such a library is referred to as a dynamic link library (DLL), a common library, or a shared library. The access control mechanism injection unit 170 injects the access control mechanism 190 into individual processes operating on the client apparatus 30 in order to cause the access control mechanism 190 to function. After being injected into the processes, the access control mechanism 190 monitors principal API calls of the processes, and controls access to resources by the processes in accordance with policies for the individual processes described in a receiver applied policy.

The protected area generation unit 172 generates a storage area in which distribution data is to be loaded (hereinafter, referred to as a protected area) on a local drive of the client apparatus 30. Here, the protected area refers to a storage area protected by encoding in such a manner that non-permitted access is excluded. Access to the protected area is, in principle, prohibited, and only a process of the access control execution module 166 and a process that is exceptionally permitted inside a receiver applied policy can access to the protected area in a permitted method. The protected area is implemented, for example, as a protected folder in such a manner that the same protection is applied to a sub-folder of the protected folder.

The data loading unit 174 decodes the distribution data 162 packaged in the distribution package 160, and loads the decoded distribution data 162 into the generated protected storage area, so that the permitted process can access to the distribution data 162. As keys to be used for decoding, a secret key of the personal certificate of the receiver terminal 30B can be used in the case of using a public key for an encryption key, and a key exchanged between the registrant terminal 30A and the receiver terminal 30B or between the data distribution server 20 and the receiver terminal 30B in advance or afterwards can be used in the case of using a common key.

After a local operation finishes, the re-packaging unit 176 encodes local data in a protected area and re-packages the encoded local data. After the local operation finishes and re-packaging is completed, the protected area elimination unit 178 deletes the local data in the protected area and eliminates the protected area itself. Preferably, the protected area elimination unit 178 is capable of completely deleting the local data in the protected area by overwriting a random value. Accordingly, after a process of the access control execution module 166 ends, traces of highly confidential and loaded data are deleted from the local drive of the client apparatus 30.

Figure 8:
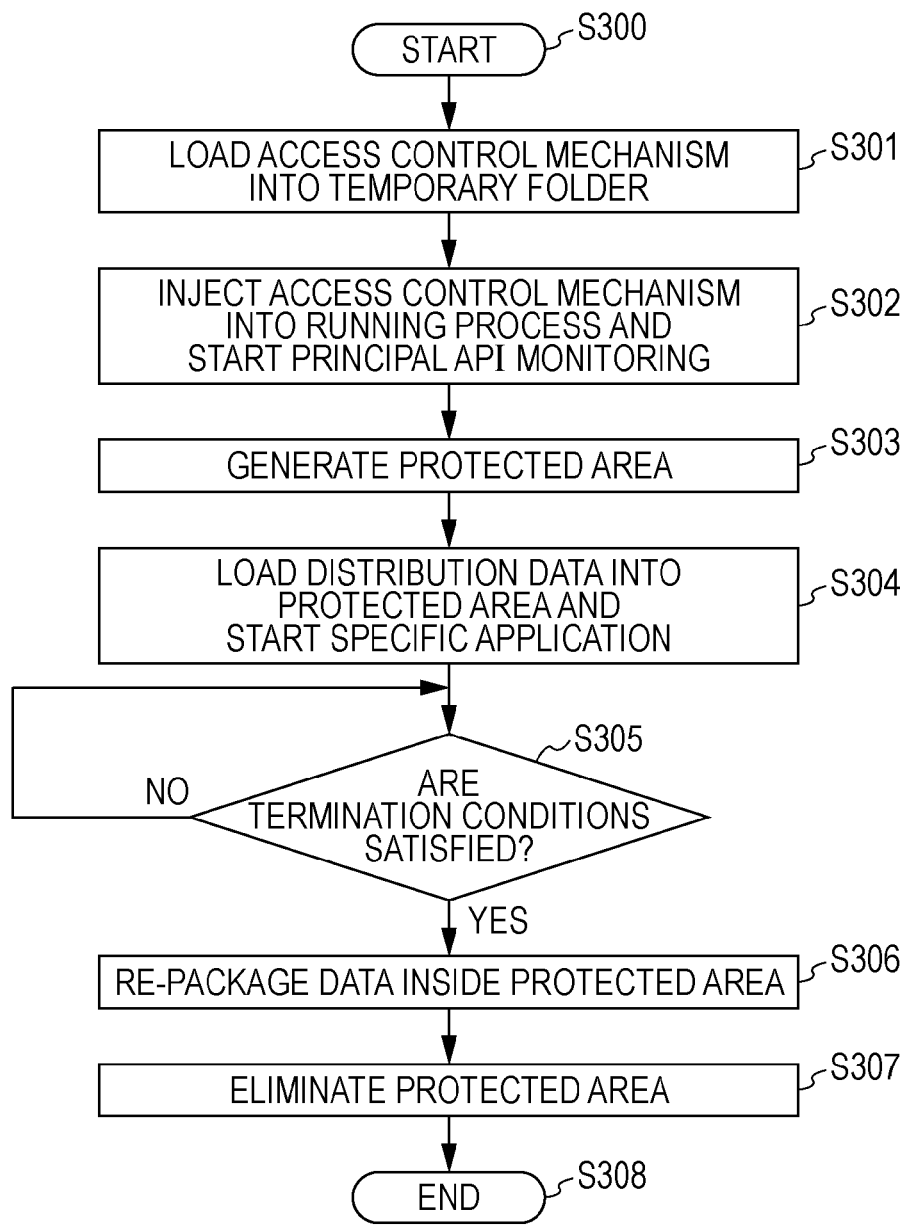
FIG. 8 is a flowchart illustrating an access control execution process performed by the client apparatus according to the first embodiment of the present invention.

FIG. 8 is a flowchart illustrating an access control execution process performed by the client apparatus according to the first embodiment of the present invention. Hereinafter, an example of a process in a Windows® environment will be explained. However, similar processing may be performed for a different OS. The process illustrated in FIG. 8 starts in step S300 in response to activation of the distribution package 160 (the access control execution module 166 in a package) on the client apparatus 30.

In step S301, the access control execution module 166 loads a DLL implementing the access control mechanism 190 into a temporary folder. In step S302, the access control execution module 166 lists processes running on the client apparatus 30, and injects the DLL of the access control mechanism 190 for all the processes (DLL injection). Accordingly, the injected DLL of the access control mechanism 190 starts to monitor principal API calls by the individual processes, and the above-described access control in units of processes is executed.

In step S303, the access control execution module 166 generates a protected area (protected folder). In step S304, the execution module 166 loads the distribution data 162 in the distribution package 160 into the protected area, and activates an application for processing the distribution data. Until termination conditions are satisfied in step S305 (during the period in which the determination is NO), step S305 is looped through. Application software for editing the distribution data 162 in the package can be specified for the distribution package 160. During running of the applications, the access control mechanism 190 operates. Under the above-described access control in units of processes, information leakage is prevented. Meanwhile, when all the activated applications are terminated, it is determined that termination conditions are satisfied.

When it is determined in step S305 that termination conditions are satisfied (YES), the process proceeds to step S306, in which the access control execution module 166 re-packages local data in the protected area. In step S307, the local data in the protected area is deleted and the protected area is eliminated. In step S308, the process is terminated. In the above-described embodiment, an explanation has been provided in which local data in a protected area is re-packaged. However, in the case of read-only distribution data or the like, loaded data may be deleted without performing re-packaging.

Figure 9:
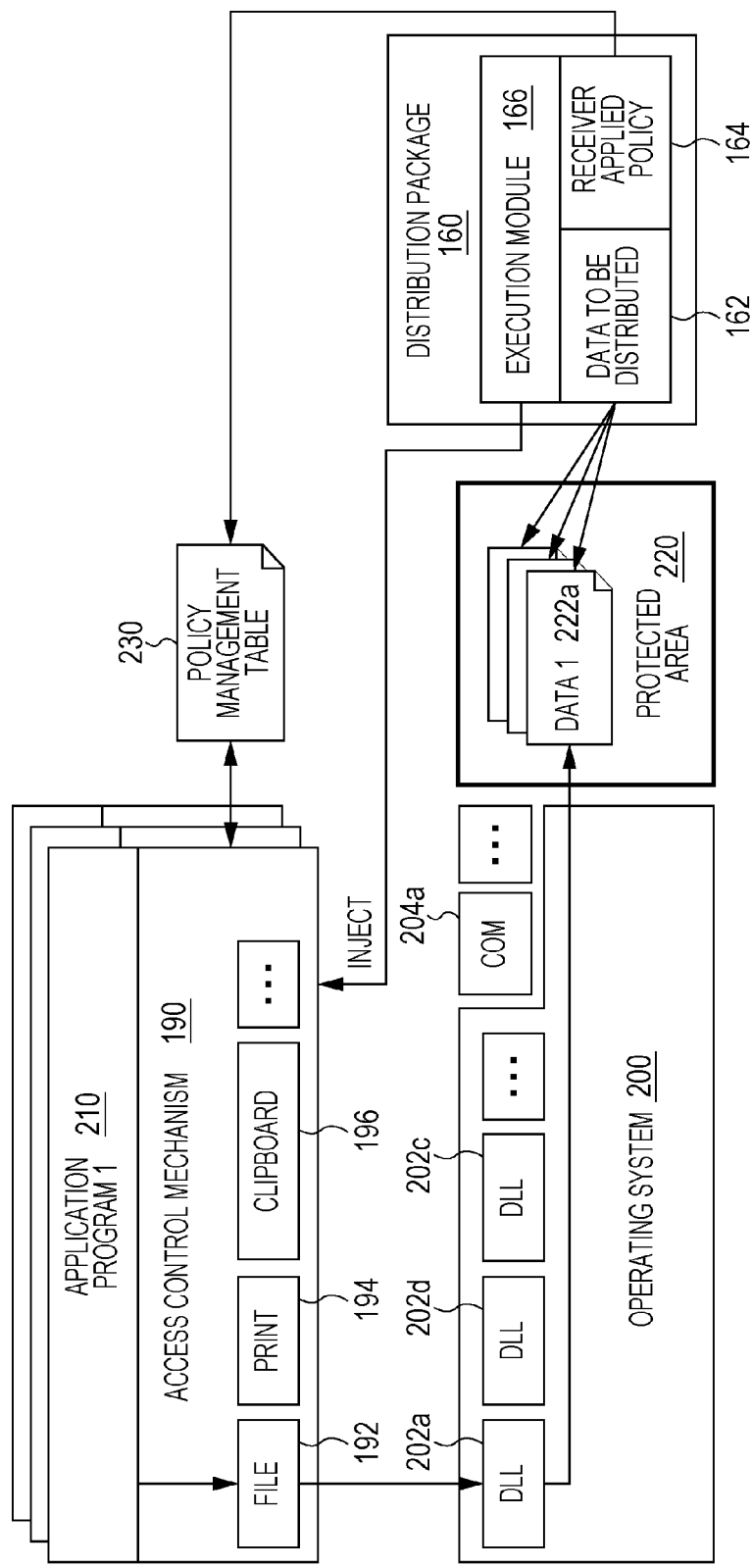
FIG. 9 is a functional block diagram implemented on a client apparatus in which an access control module is activated, according to the first embodiment of the present invention.

Hereinafter, the operation of the access control mechanism 190 will be explained with reference to FIG. 9. FIG. 9 is a diagram illustrating a functional block implemented on the client apparatus in which the access control execution module is activated, according to the first embodiment of the present invention. Hereinafter, an example of a functional block in the Windows® environment will be explained.

As illustrated in FIG. 9, DLLs of the access control mechanisms 190 are injected to processes 210, such as application programs operating on the client apparatus 30, in accordance with operation of the access control execution module 166. The DLLs of the access control mechanisms 190 monitor principal API calls of the processes, and control access to low-level resources, such as file 192, print 194, a clipboard 196, and the like in accordance with the policy.

When a policy defining information flow control for a destination subsequent to a distribution destination for data in a distribution package (for example, the range of data that can be re-ordered) is described in a security policy, the DLL of the access control mechanism 190 is capable of controlling, in accordance with the policy, whether or not to permit a registration request in which distribution data in the protected area or part or all of secondary data of the distribution data serves as distribution data, using the above-described mechanism for monitoring API calls. Permission or non-permission of the registration request can be controlled by permission or prohibition of an upload operation by a browser. A security policy defining the range of data that can be re-ordered may include, for example, a description in which an upload operation by a browser is prohibited in principle and reading of distribution data or part or all of secondary data of the distribution data is exceptionally permitted for an upload destination URL that satisfies specific conditions.

As the principal API, for example, a Win32API function, such as CreateFile, DeleteFile, CopyFile, StartDoc, SetClipboardData, GetClipboardData, or CreateProcess, included in DLLs 202a to 202c, such as GDI32.dll, User32.dll, and Kernel32.dll, provided in the secondary system 200 may be used in the Windows® environment. Furthermore, the access control mechanism 190 is capable of monitoring a method call of a specific COM (Component Object Model) interface 204a and controlling access to a high-level resource.

The receiver applied policy 164 included in the distribution package 160 is loaded as a policy management table 230 on a memory, and the DLL of the access control mechanism 190 executes access control by referring to the policy management table 230. For example, the application program 210 calls the API of the DLL 202 to access data 222 in a protected area 220. The access control mechanism 190 determines, in accordance with entry in the policy management table, whether or not to cause the API call to pass. The policy management table may be static data. However, preferably, in order to reflect the state of a window and a process in real time, a management mechanism (not illustrated) for feeding back API and COM call records and a notification message from an OS to an application may be provided so that the policy management table 230 can be dynamically updated in accordance with user operation conditions.

For example, when screen copying is prohibited, the point as to whether or not a window displaying a file of an application to be protected is viewable on the screen is important. Thus, in order to determine as to the active state and viewable stat of the window, the management mechanism is capable of dynamically updating the policy management table 230 on a memory by monitoring a window message such as WM_CREATE, determining, in accordance with information such as a window class name, a title name, and a window attribute, which file is displayed and which file is activated, and detecting an event.

For the above-described dynamic access control mechanism according to the context of a GUI, Sanehiro Furuichi and Michiharu Kudo, "GUI beesu no conpyuta ni tekishita akusesu seigyo porishi kanri houhou no teian (Access Control Policy Management for GUI-based Computer)", Journal of Information Processing Society of Japan, Vol. 49, No. 9, pp. 1-11 (September, 2008) can be referred to for more details. The above-described access control mechanism 190 is based on Binary Interception for a principal API and a COM interface. However, similar application may be made for OS environments different from Windows®, such as UNIX® or MAC OS®.

Figure 10:
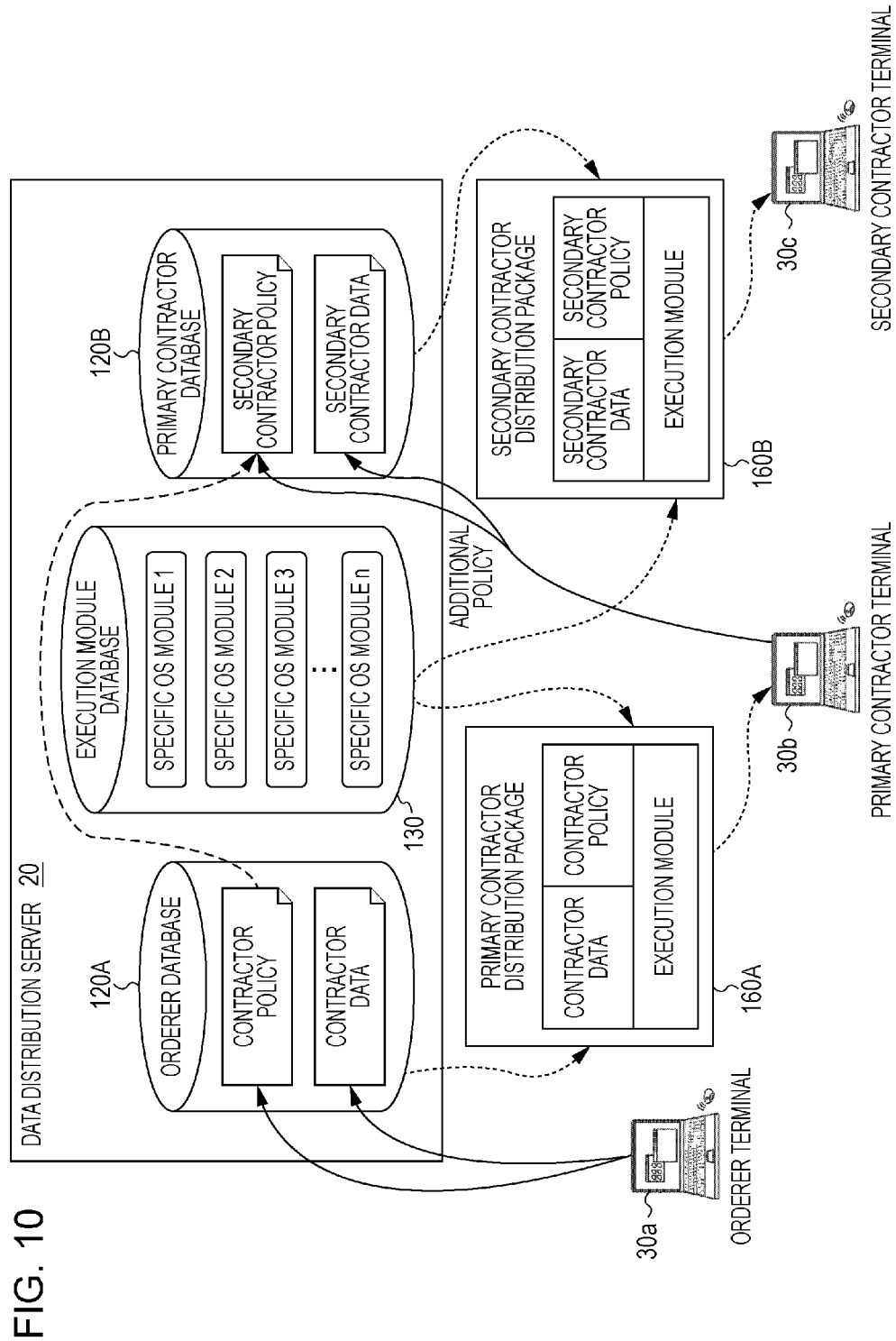
FIG. 10 is a diagram illustrating the flow of a service performed among an orderer, a primary contractor, and a secondary contractor in the data processing system illustrated in FIG. 1.

Hereinafter, the manner of use of a data distribution function provided by the data distribution server 20 according to this embodiment will be explained with reference to FIG. 10. FIG. 10 is a diagram illustrating the flow of a service performed among an orderer, a primary contractor, and a secondary contractor in the data processing system 10 explained with reference to FIG. 1. First, the orderer terminal 30a, serving as a registrant terminal, transmits to the data distribution server 20 a package registration request in which a specific primary contractor is set as a distribution destination. The data distribution server 20 receives distribution destination information, contractor data, a contractor policy from the orderer terminal 30a, and stores the received distribution destination information, contractor data, and contractor policy into an orderer database 120A. Accordingly, contractor data is registered so as to be distributed.

Meanwhile, the primary contractor terminal 30b serving as a receiver terminal, transmits to the data distribution server 20 a package reception request for contractor data. The data distribution server 20 transmits, as response to the reception request, a primary contractor distribution package 160A including the contractor data, the contractor policy, and an execution module to the primary contractor terminal 30b. Then, in the primary contractor terminal 30b, the contractor data in the primary contractor distribution package 160A is loaded, and a local operation for the contractor data is performed under the control of an access control mechanism.

In the case where the primary contractor terminal 30b places an order with a subcontractor for part of the contracted service, the primary contractor terminal 30b serving as a registrant terminal transmits to the data distribution server 20 at least permitted part of the contractor data in a protected area (hereinafter, referred to as secondary contractor data) and an additional policy additionally applied to the data to be delivered from the primary contractor to the secondary contractor, and transmits a package registration request in which a distribution destination is set to a specific secondary contractor. In this case, a secondary contractor policy is configured in such a manner that a registrant specified policy for contractor data serving as the origin is inherited.

Data that can be re-ordered from a primary contractor to a secondary contractor can be described in a contractor policy that is specified by an orderer, which is the original source. For example, the contractor policy may include a description in which reading of a file that can be re-ordered is exceptionally permitted for an upload destination URL for re-ordering. As described above, in this embodiment, an orderer is able to set information flow control for contractors subsequent to the primary contractor.

The secondary contractor terminal 30c, which undertakes part of a service of a primary contractor, serves as a receiver terminal The secondary contractor terminal 30c transmits a package reception request for secondary contractor data to the data distribution server 20, acquires a secondary receiver distribution package 160B including secondary contractor data, a secondary contractor policy, and an execution module, and performs a local operation for the secondary contractor data.

Subsequently, when data after being operated needs to be returned to the ordering source, the secondary contractor terminal 30c serving as the receiver terminal transmits to the data distribution server 20 a distribution package that is re-packaged after the operation is completed, and transmits a request to return the package to the primary contractor. The primary contractor terminal 30b serving as a registrant terminal receives from the data distribution server 20 the distribution package returned from the secondary contractor. Similarly, the primary contractor terminal 30b serving as a receiver terminal transmits to the data distribution server 20 a request to return the package to the orderer. The orderer terminal 30a serving as a registrant terminal receives from the data distribution server 20 the distribution package returned from the primary contractor.

According to the first embodiment of the present invention described above, a registrant of distribution data imposes a specific security policy on the operation environment of a distribution destination, and the distribution data can be delivered to the distribution destination. The distribution data is stored under the local environment of the distribution destination. For distribution data existing under the local environment, access to a resource by a running process is controlled in accordance with a security policy using the access control mechanism described above, and the range where the distribution data can be circulated is restricted. Accordingly, for example, information leakage by unintentional data release after authenticated information provision to a business partner, that is, secondary leakage, can be prevented. Furthermore, after an operation in a local environment is completed, distribution data may be deleted from the local environment or may be returned after deletion.

Furthermore, since the data distribution server 20 detects the environment of a distribution destination and distributes a package including an appropriate access control execution module, the operation efficiency can be improved without causing a registrant to be bothered by a packaging method for the data. Furthermore, according to the embodiment described above, there is no need to compulsorily introduce and set complicated special control software to a distribution destination. Furthermore, since a method for implementing access control by injecting a library into a running process is employed, the above-described access control execution module can be applied to various data and various applications, in principle.

In the embodiment described above, furthermore, since a specific security policy can also be imposed on information flow control for that subsequent to a distribution destination, for example, the range of data that can be re-ordered can be restricted by an orderer, which is the original source. Thus, information leakage from a sub-subcontractor and a sub-sub-subcontractor can be prevented in an appropriate manner.

It is desirable that confidential information stored in a local terminal of a contractor be deleted or become unusable, in particular, after the contract period expires. Hereinafter, a second embodiment in which the term of validity is set for a distribution package and distribution data in the distribution package becomes unusable when the term of validity has expired will be explained. Since the data distribution server 20 according to the second embodiment has a configuration similar to that of the first embodiment, the explanation will be provided with an emphasis on points that are different from the first embodiment. Furthermore, functional units having functions similar to those in the first embodiment will be referred to with the same reference numerals.

Figure 11:
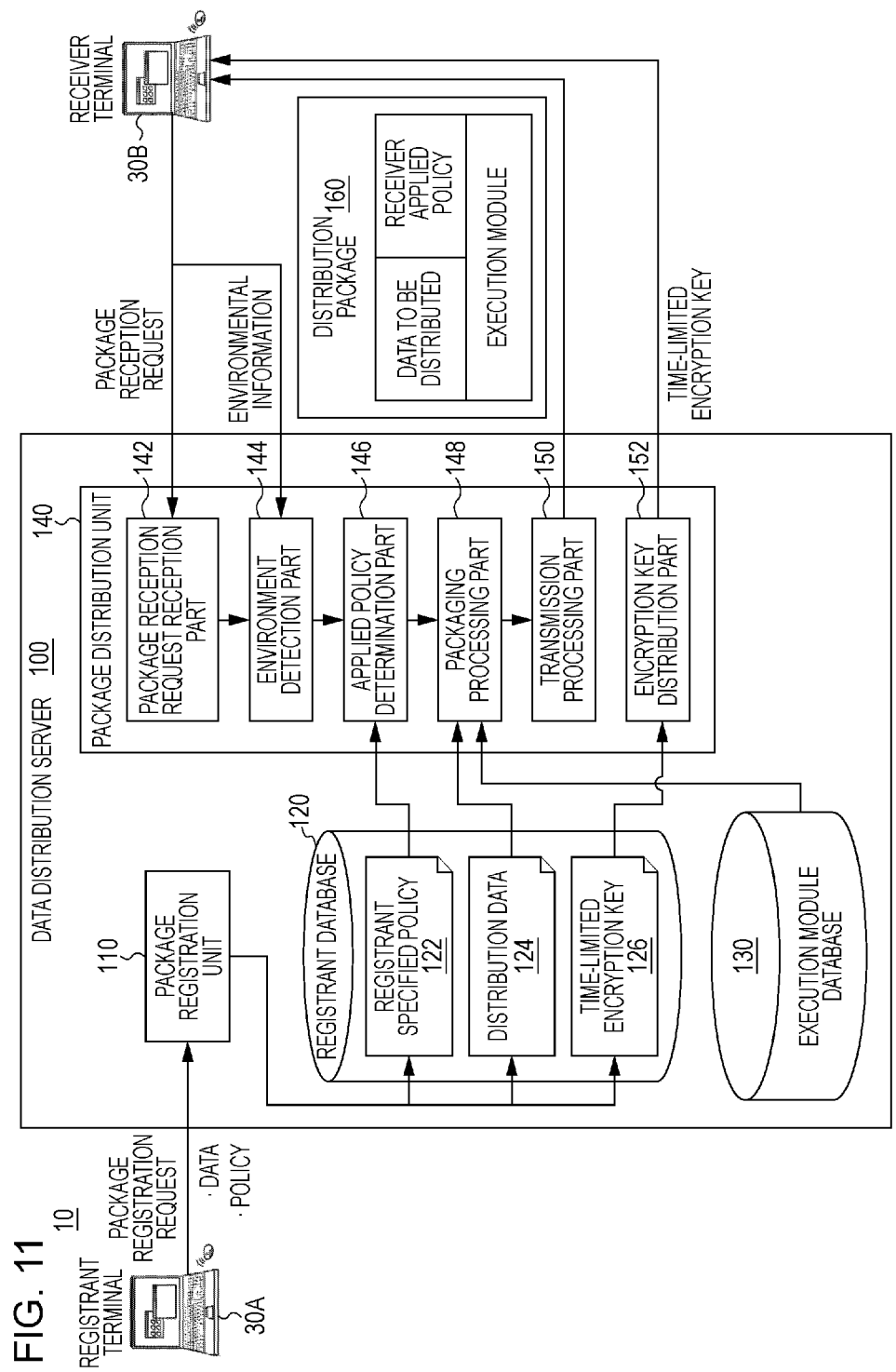
FIG. 11 is a functional block diagram implemented on a data distribution server according to a second embodiment of the present invention.

FIG. 11 is a functional block diagram implemented in a data distribution server according to the second embodiment of the present invention. The functional block 100 of the data distribution server 20 illustrated in FIG. 11 includes the package registration unit 110 and the registrant database 120.

The registrant terminal 30A transmits to the data distribution server 20 a package registration request for distribution data. The package registration request includes the term of validity set for distribution data, as well as the distribution data, a registrant specified policy, and distribution destination information. The term of validity is input via a web browser, similarly to a security policy, and values of the individual input items are transmitted to the data distribution server 20, for example, together with the security policy. A GUI for setting the term of validity is, for example, provided as a web page in such a manner that the web browser of the registrant terminal 30A can interpret.

The package registration unit 110 receives the package registration request transmitted from the registrant terminal 30A, acquires the distribution data, the registrant specified policy, and the distribution destination information, and the term of validity regarding the request, and acquires a policy to be inherited in an appropriate manner. The package registration unit 110 according to this embodiment also acquires an encryption key used for encoding the distribution package. The encryption key is not particularly limited. However, the encryption key may be generated by the data distribution server 20 or may be transmitted together with the package registration request from the registrant terminal 30A. The package registration unit 110 sets the term of validity for the encryption key, stores the distribution destination information, the registrant specified policy 122, the distribution data 124, and a time-limited encryption key 126 into the registrant database 120, and registers the distribution data so as to be distributed.

The functional block 100 of the data distribution server 20 further includes the execution module database 130 and the package distribution unit 140. More specifically, the package distribution unit 140 according to this embodiment includes the package reception request reception part 142, the environment detection part 144, the applied policy determination part 146, the packaging processing part 148, the transmission processing part 150, and an encryption key distribution part 152.

The packaging processing part 148 encodes at least distribution data, and generates a packaged distribution data including the encoded distribution data, a receiver applied policy, and an access control execution module. The transmission processing part 150 transmits the generated distribution package 160 to the receiver terminal 30B, which is a reception requesting source for the distribution data. The encryption key distribution part 152 reads a corresponding time-limited encryption key from the registrant database 120, in response to a key acquisition request from the access control execution module 166 activated on the receiver terminal 30B, and provides the encryption key to the receiver terminal 30B if the term of validity has not expired. If the term of validity has expired, provision of the encryption key stops.

Figure 12:
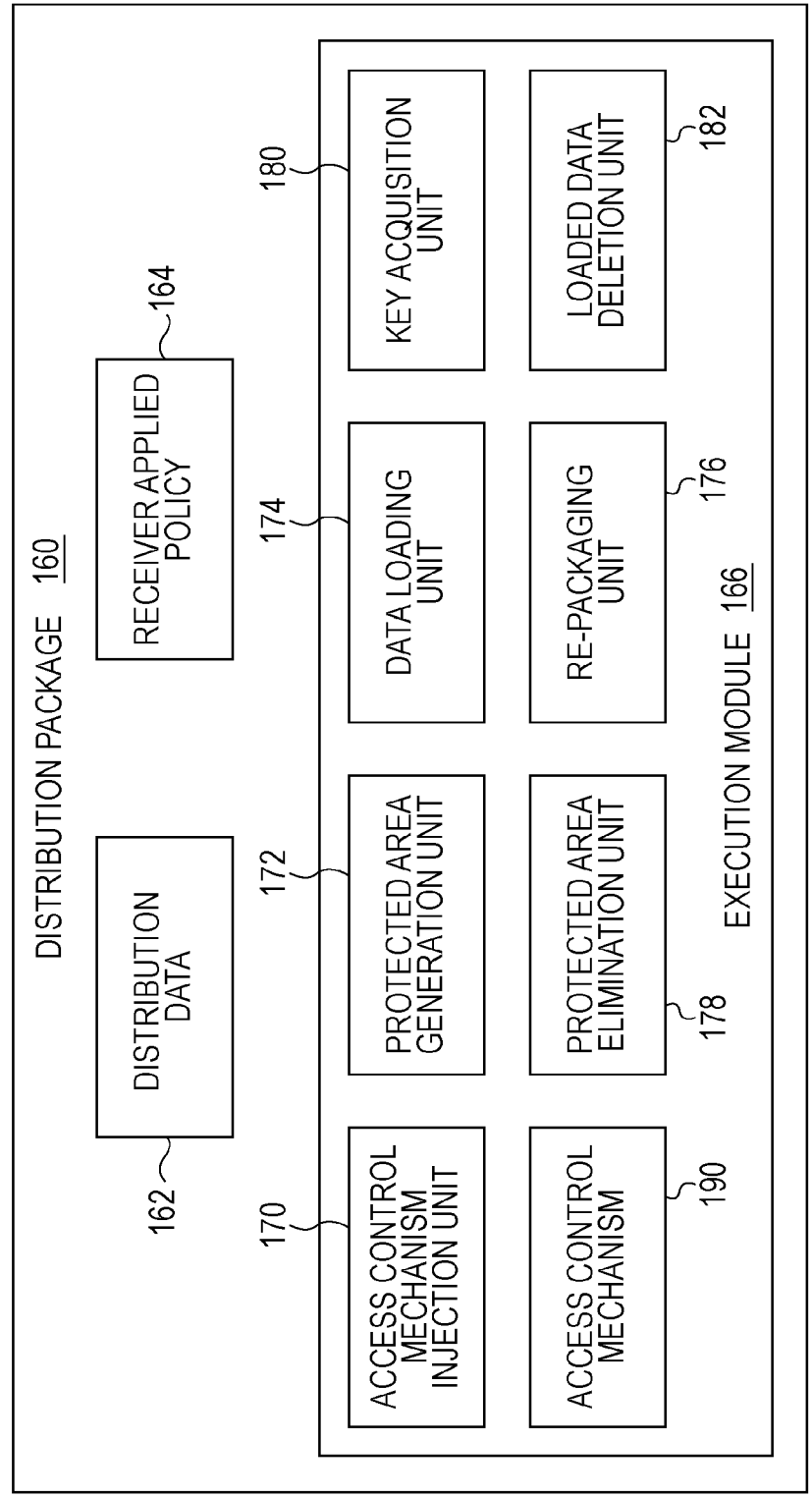
FIG. 12 is a detailed functional block diagram of a distribution package distributed to a client apparatus in the second embodiment of the present invention.

Hereinafter, processing by a client side that receives a distribution package according to the second embodiment will be explained. FIG. 12 is a diagram illustrating the detailed functional block of a distribution package distributed to a client apparatus according to the second embodiment of the present invention. Similarly to the first embodiment, the distribution package illustrated in FIG. 12 includes the access control execution module 166, the distribution data 162, and the receiver applied policy 164.

The execution module 166 according to the second embodiment includes program code for implementing the access control mechanism injection unit 170, the protected area generation unit 172, the data loading unit 174, the re-packaging unit 176, the protected area elimination unit 178, the access control mechanism 190, a key acquisition unit 180, and a loaded data deletion unit 182.

The key acquisition unit 180 is a functional unit that communicates with the data distribution server 20 to acquire a time-limited encryption key. The data loading unit 174 decodes the distribution data in the distribution package 160 using the acquired encryption key, and loads the decoded distribution data into the generated protected area. The loaded data deletion unit 182 regularly or irregularly deletes the data loaded in the protected area. In association with the deletion of the loaded data, the key acquisition unit 180 acquires a time-limited encryption key again from the data distribution server 20, and the data loading unit 174 decodes the data in the distribution package 160 again using the acquired encryption key and loads the data into the protected area. The key acquisition unit 180, the data loading unit 174, and the loaded data deletion unit 182 define an expiration processing unit of this embodiment.

Figure 13:
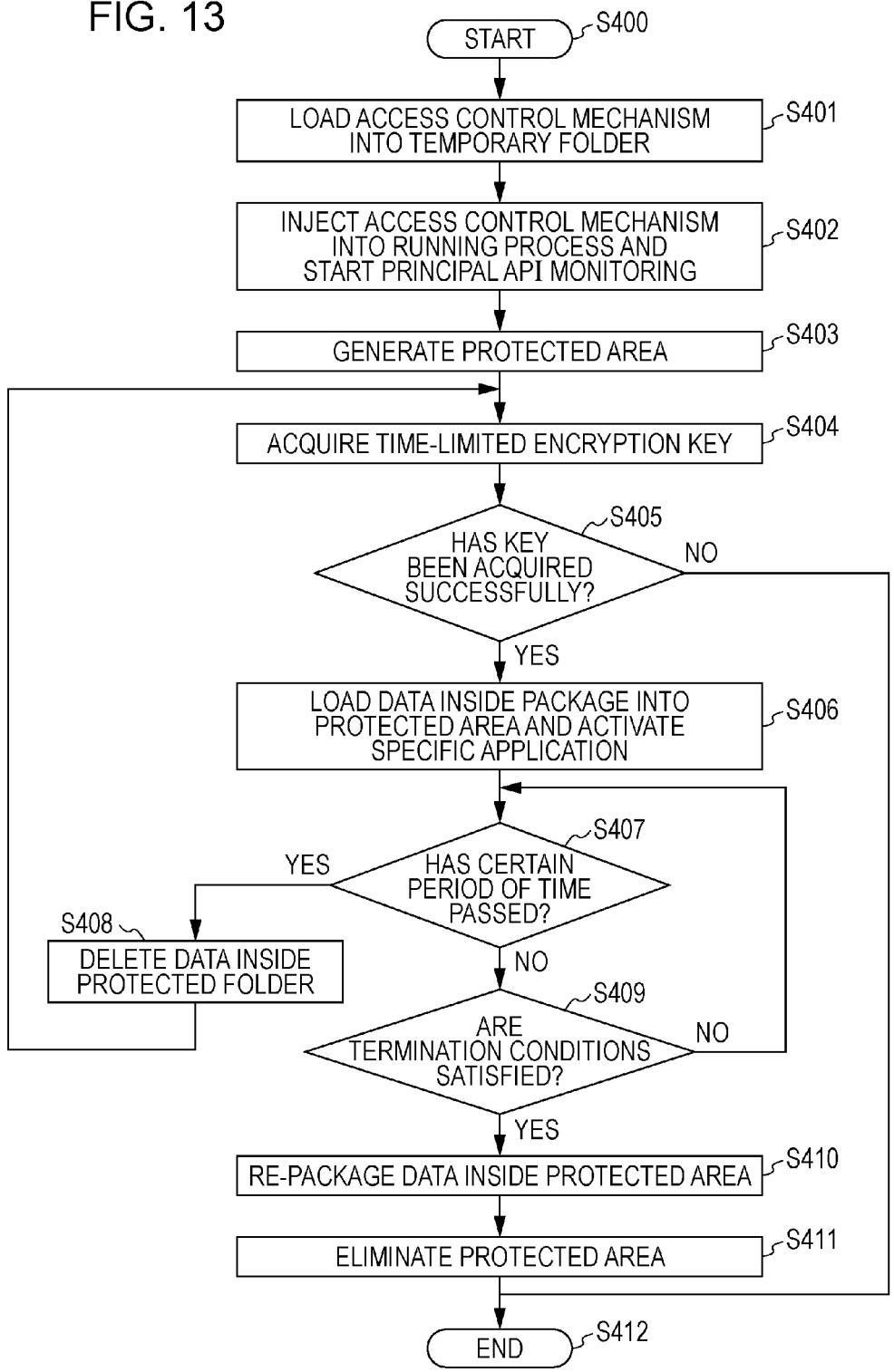
FIG. 13 is a flowchart illustrating an access control execution process performed by a client apparatus according to the second embodiment of the present invention.

FIG. 13 is a flowchart illustrating an access control execution process performed by a client apparatus according to the second embodiment of the present invention. The process illustrated in FIG. 13 starts in step S400 in response to activation of the distribution package 160 (the access control execution module 166) on the client apparatus 30.

In step S401, the execution module 166 loads a DLL implementing the access control mechanism 190 into a temporary folder. In step S402, the execution module 166 lists processes running on the client apparatus 30, and injects the DLL of the access control mechanism 190 for all the processes. In step S403, the execution module 166 generates a protected area. In step S404, the execution module 166 communicates with the data distribution server 20, and tries to acquire a time-limited encryption key.

In step S405, the execution module 166 determines whether or not acquisition of the key has succeeded. When it is determined in step S405 that acquisition of the key has failed (NO), the process branches off to step S412, and the process is terminated. Meanwhile, when it is determined in step S405 that acquisition of the key has succeeded (YES), the process braches off to step S406.

In step S406, the execution module 166 loads the distribution data 162 in the distribution package 160 into the protected area, and activates an application. In step S407, the execution module 166 determines, for example, whether or not a certain period of time has passed. When it is determined in step S407 that the certain period of time has not passed (NO), the process proceeds to step S409, and a loop to step S407 is repeated until termination conditions are satisfied (during the period in which the determination in step S409 is NO). Meanwhile, when it is determined in step S407 that the certain period of time has passed (YES), the process proceeds to step S408. In step S408, the execution module 166 once deletes the data in the protected area, and the process enters a loop to step S404.

Meanwhile, when it is determined in step S409 that the termination conditions are satisfied (YES), the process proceeds to step S410, in which the execution module 166 re-packages the data in the protected area. In step S411, the execution module 166 eliminates the protected area. In step S412, the process is terminated.

By the loop from steps S404 to S409 described above, deletion of data within the protected area, re-acquisition of the key, and re-loading are regularly repeated, and the key cannot be acquired after the term of validity of the key has expired. Thus, after the term of validity has expired, the data in the distribution package cannot be used. In the second embodiment described above, the description has been provided in which the loaded data is deleted. However, in the case of distribution data that can be overwritten, a configuration may be provided in which a difference between the current local data within the protected area and distribution data at the time when the distribution package is being distributed is saved in a different storage area, instead of deletion of the data.

In the second embodiment described above, restriction can be made in such a manner that distribution data can not be used. Thus, for example, after the term of a contract has expired, confidential data stored in a local terminal of a contractor can be made unusable. Therefore, unauthorized use or leakage after the term of the contract has expired can be avoided.

As described above, according to the embodiments described above, data distribution is performed in the form of a distribution package including an access control mechanism executing access control for distribution data. Thus, a data distribution apparatus and a data distribution system that are capable of controlling information flow of data, and in addition, that are capable of avoiding information leakage from a distribution destination without imposing restriction on the use environment of the distribution destination and without placing excessive workload on the distribution destination can be provided. Furthermore, according to the embodiments described above, a client apparatus that receives a distribution package from the data distribution apparatus or the data distribution system, a data distribution method that is performed by the data distribution apparatus, a data reception method that is performed by the client apparatus, a program for implementing the data distribution apparatus, and a recording medium that stores the program can be provided.

In the embodiments described above, examples of the data distribution server 20 configured as a single computer have been explained. However, in a different embodiment, a configuration may be adopted in which the data distribution function is implemented as a cloud service on a computer system including a plurality of computers.

Furthermore, in the embodiments described above, the description has been provided in which registered distribution data is distributed as a distribution package in response to a reception request from the receiver terminal 30B. However, since it is assumed that subcontractors in manufacturing industries are in the environment in which connection to the Internet is not possible, it may be desirable that a method for providing a distribution package via a physical recording medium should be ensured. Thus, in a different embodiment, a registrant can acquire a packaged distribution package from the data distribution server 20, and the acquired distribution package can be written to a recording medium such as a CD-R, a USB flash, or an SD card. In this case, by sending such a recording medium by post or the like, a distribution package to which a security policy is applied can be provided to a desired destination. In this case, an encryption key may be transmitted by post, orally, or other means.

Furthermore, in the embodiments described above, the examples of a data processing system that performs data distribution have been explained. However, implementation as a collaboration system having various functions such as schedule management, project management, task management, workflow management, and the like may be done. Furthermore, in a different embodiment, implementation as a content management system that securely distributes an electronic document etc. may be done.

The above-mentioned functions of the present invention can be implemented by an apparatus-executable program described in a legacy programming language, an object-oriented programing language, or the like, such as assembler, C, C++, Java®, JavaBeans®, Java® Applet, JavaScript®, Perl, or Ruby, and can be stored in a recording medium, such as a a ROM, an EEPROM, an EPROM, a flash memory, a flexible disk, a CD-ROM, a CD-RW, a DVD-ROM, a DVD-RAM, a DVD-RW, a Blu-ray disc, an SD card, or an MO, which can be read by an apparatus, and distributed or can be transmitted and distributed.

The present invention has been explained by way of examples of specific embodiments and examples. However, the present invention is not limited to the specific embodiments or examples. Other embodiments and changes, such as addition, alteration, or deletion, can be made to the present invention within the scope conceivable by those skilled in the art, and any forms are included in the scope of the present invention as long as an operation and advantage of the present invention can be achieved.

REFERENCE SIGNS LIST

10 . . . data processing system, 12 . . . network, 20 . . . data distribution server, 30 . . . client apparatus, 100 . . . functional block, 110 . . . package registration unit, 112 . . . package registration request reception part, 114 . . . data/policy acquisition part, 116 . . . registration processing part, 120 . . . registrant database, 122 . . . registrant specified policy, 124 . . . distribution data, 126 . . . time-limited encryption key, 130 . . . execution module database, 132 to 138 . . . execution module, 140 . . . package distribution unit, 142 . . . package reception request reception part, 144 . . . environment detection part, 146 . . . applied policy determination part, 148 . . . packaging processing part, 150 . . . transmission processing part, 152 . . . encryption key distribution part, 160 . . . distribution package, 162 . . . distribution data, 164 . . . receiver applied policy, 166 . . . access control execution module, 170 . . . access control mechanism injection unit, 172 . . . protected area generation unit, 174 . . . data loading unit, 176 . . . re-packaging unit, 178 . . . protected area elimination unit, 180 . . . key acquisition unit, 182 . . . loaded data deletion unit, 190 . . . access control mechanism, 192 . . . file, 194 . . . print, 196 . . . clipboard, 200 . . . OS, 202 . . . DLL, 204 . . . COM interface, 210 . . . application process, 220 . . . protected area, 222 . . . data, 230 . . . policy management table

The invention claimed is:

1. A data distribution system in communication with a requesting client over a network, comprising:
   a processor;
   a computer readable device including at least one program executed by the processor to perform operations, the operations comprising:
   receiving a reception request for distribution data from the requesting client;
   detecting an environment of the requesting client, including an operating system and drive information of a storage device in the requesting client;
   providing a key with a term of validity for the distribution data;
   determining an access control execution program depending on a type of the operating system of the requesting client, wherein the access control execution program implements an access control mechanism, and a loading unit on the requesting client comprising program code, wherein the access control mechanism monitors calls from processes running on the requesting client and controls access to a resource from the processes running in the requesting client in a manner that depends on a security policy determined for the distribution data, wherein the loading unit loads the distribution data to a protected storage area of the storage device of the requesting client, wherein the access control execution program includes code to execute on the requesting client, after the term of validity of the key has expired, an expiration process to restrict access to the distribution data in the protected storage area;
   generating a distribution package including the distribution data, the security policy, the loading unit, and the access control execution program implementing the access control mechanism for the requesting client operating system; and
   transmitting the generated distribution package and the key with the term of validity to the requesting client.

2. The data distribution system of claim 1, wherein the operations further comprise:
   in response to a registration request for the distribution data, registering the distribution data for which registration is requested, the security policy defining information flow control for the distribution data, and information on a distribution destination of the distribution data.

3. The data distribution system of claim 2, wherein the access control execution program includes code for executing on the requesting client when an operation using the distribution data finishes, to delete data in the protected storage area and eliminate the protected storage area.

4. The data distribution system of claim 3,
   wherein the security policy specified for the distribution data defines an information flow control for a distribution destination subsequent to the distribution destination for at least part of the distribution data;
   wherein the access control mechanism controls, in accordance with the security policy, whether or not a registration request for at least part of local data in the protected storage area as distribution data is to be permitted; and
   wherein the operations further comprise storing, in response to the registration request for the at least part of local data as the distribution data, a security policy inheriting a policy specified for distribution data serving as an origin of the local data and the at least part of the local data as the distribution data.

5. The data distribution system of claim 1, wherein the expiration process is executed to delete local data in the protected storage area or save a difference between the local data in the protected storage area and the distribution data in the distribution package, re-acquire the key associated with the distribution data, and restore data in the protected storage area using the re-acquired key.

6. The data distribution system of claim 1, wherein access to a resource from the process controlled in the manner that depends on the security policy includes at least one of reading of local data in the protected storage area, storing of the local data into a removable medium, storing of the local data into a non-protected storage area, printing of the local data, copying to a clipboard in a state where the local data is opened, copy and paste between processes through a clipboard in a state where the local data is opened, screen copying in a state where a window of the local data is in an active mode, and writing to the protected storage area.

7. The data distribution system of claim 1, wherein the operations further comprise:
   changing the security policy specified for the distribution data in a manner that depends on the environment of the requesting client; and
   determining the security policy to be included in the distribution package.

8. A client computer connected over a network to a data distribution system distributing a distribution package, comprising:
   a processor;
   a computer readable device including at least one program executed by the processor to perform operations, the operations comprising:
      transmitting, to the data distribution system, a reception request for distribution data;
      transmitting, to the data distribution system, environmental information describing an environment of the client computer, including an operating system and drive information of a storage device in the client computer;
      receiving, from the data distribution system, a distribution package including the distribution data, a security policy specified for the distribution data, and an access control execution program depending on a type of the operating system of the client computer, and a key with a term of validity in association with the distribution data, wherein the access control execution program implements an access control mechanism, and a loading unit comprising program code;
      executing, the access control execution program and the access control mechanism to monitor calls from the processes running on the client computer and control access to a resource from the processes running in the client computer in a manner that depends on the security policy, wherein the access control execution program includes code to execute, after the term of validity of the key has expired, an expiration process to restrict access to the distribution data in a protected storage area; and
      executing the loading unit to load the distribution data to the protected storage area of the storage device at the client computer.

9. The client computer of claim 8, wherein the operations further comprise:
   deleting local data in the protected storage area; and
   eliminating the protected storage area.

10. The client computer of claim 9, wherein the operations further comprise:
    determining whether termination conditions are satisfied in response to active applications in the client computer terminating, wherein the operations of deleting the local data and eliminating the protected storage area are performed in response to determining that the termination conditions are satisfied.

11. A data distribution method implemented in a computing system for providing a distribution package, comprising:
    receiving a reception request for distribution data from a requesting client;
    detecting, by a central processing unit, an environment of the requesting client, including an operating system and drive information of a storage device in the requesting client;
    determining distribution data to be distributed and a security policy specified for the distribution data;
    providing a key with a term of validity for the distribution data;
    determining an access control execution program depending on a type of the operating system of the requesting client, wherein the access control execution program implements an access control mechanism and a loading unit comprising program code, wherein the access control mechanism monitors calls from processes running on the requesting client and controls access to a resource from the processes running in the requesting client in a manner that depends on the security policy determined for the distribution data, wherein the loading unit loads the distribution data to a protected storage area of the storage device at the requesting client, wherein the access control execution program includes code to execute on the requesting client, after the term of validity of the key has expired, an expiration process to restrict access to the distribution data in the protected storage area;
    generating a distribution package including the distribution data, the security policy, the loading unit, and the access control execution program implementing the access control mechanism for the requesting client operating system; and
    transmitting the generated distribution package and the key with the term of validity to the requesting client.

12. The data distribution method of claim 11 wherein the expiration process is further executed to delete local data in the protected storage area or save a difference between the local data in the protected storage area and the distribution data in the distribution package, re-acquire the key associated with the distribution data, and restore data in the protected storage area using the re-acquired key.

13. The data distribution method of claim 11, wherein the access to the resource from the process in the requesting client controlled in the manner that depends on the security policy includes at least one of reading of local data in the protected storage area, storing of local data into a removable medium, storing of the local data into a non-protected storage area, printing of the local data, copying to a clipboard in a state where the local data is opened, copy and paste between processes through a clipboard in a state where the local data is opened, screen copying in a state where a window of the local data is in an active mode, and writing to the protected storage area.

14. The data distribution method of claim 11, further comprising:
    storing in response to a registration request for the distribution data, the distribution data for which registration is required, the security policy defining information flow control for the distribution data, and information on a distribution destination of the distribution data; and
    registering the distribution data.

15. The data distribution method of claim 14,
    wherein the security policy specified for the distribution data defines an information flow control for a distribution destination subsequent to the distribution destination for at least part of the distribution data, wherein the access control mechanism controls, in accordance with the security policy, whether or not the registration request for at least part of local data in the protected storage area as the distribution data is to be permitted, and wherein the registering causes a security policy specified for distribution data serving as an origin of the local data to be inherited by a security policy specified for the at least part of the local data, in response to the registration request for the at least part of the local data as the distribution data.

16. The data distribution method of claim 15, further comprising:

in response to a key acquisition request from the requesting client, determining the key with the term of validity stored in association with the distribution data; and transmitting the key to the requesting client, wherein the access control execution program includes code for further implementing on the requesting client, after the term of validity of the key has expired, an expiration process to restrict access to the distribution data and the local data in the protected storage area.

17. A method implemented in a computing system for receiving distribution data, comprising:

transmitting, by a central processing unit in the computing system, a reception request for distribution data to a data distribution system;

transmitting environmental information describing an environment of the computing system to the data distribution system, including an operating system and drive information of a storage device in the computing system;

receiving a distribution package including the distribution data, a security policy specified for the distribution data, an access control execution program depending on a type of the operating system of the computing system, and a key with a term of validity in association with the distribution data, wherein the access control execution program implements an access control mechanism and a loading unit comprising program code;

activating the access control execution program and the access control mechanism to monitor calls from processes running on the computing system and control access to a resource from the processes running in the computing system in a manner that depends on the security policy, wherein the access control execution program includes code to execute, after the term of validity of the key has expired, an expiration process to restrict access to the distribution data in a protected storage area; and executing the loading unit to load the distribution data to the protected storage area of the storage device at the computing system, from the data distribution system.

18. The method of claim 17, further comprising:
deleting local data in the protected storage area; and
eliminating the protected storage area.

19. The method of claim 18, further comprising:
determining whether termination conditions are satisfied in response to active applications in the computing system terminating, wherein the deleting the local data and eliminating the protected storage area are performed in response to determining that the termination conditions are satisfied.

20. A computer readable device including a program executable by a computer in communication with a requesting client, the program causing the computer to perform operations, the operations comprising:

receiving a reception request for distribution data from the requesting client;

detecting an environment of the requesting client, including an operating system and drive information of a storage device in the requesting client;

providing a key with a term of validity for the distribution data;

determining an access control execution program depending on a type of the operating system of the requesting client, wherein the access control execution program implements an access control mechanism and a loading unit on the requesting client comprising program code, wherein the access control mechanism monitors calls from processes running on the requesting client and controls access to a resource from the processes running in the requesting client in a manner that depends on a security policy determined for the distribution data, wherein the loading unit loads the distribution data to a protected storage area of the storage device of the requesting client, wherein the access control execution program includes code to execute on the requesting client, after the term of validity of the key has expired, an expiration process to restrict access to the distribution data in the protected storage area;

generating a distribution package including the distribution data, the security policy, the loading unit, and the access control execution program implementing the access control mechanism for the requesting client operating system of the requesting client; and transmitting the generated distribution package to the requesting client.

21. The computer readable device of claim 20, wherein the access control execution program includes code for executing on the requesting client when an operation using the distribution data finishes, to delete data in the protected storage area and eliminate the protected storage area.

22. The computer readable device of claim 21, further comprising:

wherein the security policy specified for the distribution data defines an information flow control for a distribution destination subsequent to the distribution destination for at least part of the distribution data, wherein the access control mechanism controls, in accordance with the security policy, whether or not a registration request for at least part of local data in the protected storage area as distribution data is to be permitted, and storing, in response to the registration request for the at least part of the local data as the distribution data, a security policy inheriting a security policy specified for distribution data serving as an origin of the local data and the at least part of the local data as the distribution data into the protected storage area.

* * * * *